US010575355B2

(12) United States Patent
Vinegrad et al.

(10) Patent No.: US 10,575,355 B2
(45) Date of Patent: Feb. 25, 2020

(54) API FOR WEB ACCESS DIRECTLY OR THROUGH INTERMEDIARY

(71) Applicant: Apple Inc., Cupertino, CA (US)

(72) Inventors: Daniel M. Vinegrad, Cupertino, CA (US); John J. Iarocci, Cupertino, CA (US); Marc J. Krochmal, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 14/632,735

(22) Filed: Feb. 26, 2015

(65) Prior Publication Data

US 2016/0066360 A1    Mar. 3, 2016

Related U.S. Application Data

(60) Provisional application No. 62/044,929, filed on Sep. 2, 2014.

(51) Int. Cl.
*H04W 76/15* (2018.01)
*H04L 29/08* (2006.01)
(Continued)

(52) U.S. Cl.
CPC .......... *H04W 76/15* (2018.02); *H04L 67/141* (2013.01); *H04L 67/28* (2013.01); *H04W 4/80* (2018.02);
(Continued)

(58) Field of Classification Search
CPC ... H04W 84/02; H04W 76/025; H04W 76/02; H04W 4/008
See application file for complete search history.

(56) References Cited

U.S. PATENT DOCUMENTS 5,485,634 A    1/1996 Weiser et al.
7,130,664 B1    10/2006 Williams
(Continued)

FOREIGN PATENT DOCUMENTS

CN    103857013    6/2014
CN    107409274    11/2017
(Continued)

OTHER PUBLICATIONS

Ex Parte Quayle Action issued in U.S. Appl. No. 14/921,481, dated Mar. 8, 2018 in 6 pages.
(Continued)

*Primary Examiner* — Vladimir Magloire
*Assistant Examiner* — Donald H B Braswell
(74) *Attorney, Agent, or Firm* — Kilpatrick, Townsend and Stockton LLP

(57) ABSTRACT

Application processes executing on a mobile device can interact with interfaces (e.g., routines of an application programming interface) exposed on that mobile device in order to establish a wireless connection either directly to a network (e.g., the Internet) or directly to an intermediary device through which the application processes can then communicate with the network indirectly. The intermediary device can communicate with the network on behalf of the mobile device. The application processes can remain unaware, in either case, of whether the interfaces are communicating with the network through the intermediary device or not. The interfaces can insulate the application processes from that fact. The use of the intermediary device can be transparent to the application processes, such that the manner in which the application processes transmit and receive data using the interfaces remains constant regardless of whether the intermediary device is involved.

31 Claims, 10 Drawing Sheets

(51) Int. Cl.
*H04W 4/80* (2018.01)
*H04W 76/14* (2018.01)
*H04W 88/04* (2009.01)
*H04W 88/06* (2009.01)

(52) U.S. Cl.
CPC ............ *H04W 76/14* (2018.02); *H04W 88/04* (2013.01); *H04W 88/06* (2013.01)

(56) References Cited

U.S. PATENT DOCUMENTS

| | | | |
|---|---|---|---|
| 7,443,817 B2 | 10/2008 | Farnham | |
| 7,730,185 B2 | 6/2010 | Chacko et al. | |
| 7,912,002 B2 | 3/2011 | Gaur | |
| 8,351,390 B2 | 1/2013 | Gaur | |
| 8,682,243 B2 | 3/2014 | Bienas et al. | |
| 8,787,006 B2 | 7/2014 | Golko et al. | |
| 8,825,040 B2 | 9/2014 | Hooli et al. | |
| 8,971,893 B2 | 3/2015 | Li et al. | |
| 9,363,010 B2 | 6/2016 | Lee et al. | |
| 9,432,931 B2 | 8/2016 | Roebke et al. | |
| 9,526,032 B2 | 12/2016 | Ely et al. | |
| 9,661,058 B2* | 5/2017 | Kim | H04L 67/02 |
| 9,886,478 B2 | 2/2018 | Kim et al. | |
| 10,085,294 B2 | 9/2018 | Flynn et al. | |
| 2002/0115478 A1 | 8/2002 | Fujisawa et al. | |
| 2002/0168959 A1* | 11/2002 | Noguchi | H04W 8/26 455/405 |
| 2006/0123484 A1* | 6/2006 | Babic | G06F 21/10 726/26 |
| 2010/0246506 A1* | 9/2010 | Krishnaswamy | H04W 72/085 370/329 |
| 2012/0254448 A1 | 10/2012 | Wheeler et al. | |
| 2013/0041728 A1 | 2/2013 | Morrow et al. | |
| 2013/0250810 A1* | 9/2013 | Ho | H04L 41/12 370/255 |
| 2013/0322281 A1* | 12/2013 | Ludlow | H04W 48/18 370/252 |
| 2013/0344842 A1 | 12/2013 | McDonald et al. | |
| 2014/0045547 A1 | 2/2014 | Singamsetty et al. | |
| 2014/0250204 A1* | 9/2014 | Shalunov | H04L 67/02 709/217 |
| 2014/0258415 A1* | 9/2014 | L'Heureux | H04L 67/1061 709/205 |
| 2014/0274050 A1 | 9/2014 | Wang et al. | |
| 2015/0350363 A1 | 12/2015 | Li et al. | |
| 2015/0365119 A1* | 12/2015 | Shin | H04M 1/0233 455/575.1 |
| 2016/0007394 A1* | 1/2016 | Hassan | H04W 76/12 455/450 |
| 2016/0014483 A1 | 1/2016 | Jha et al. | |
| 2016/0105923 A1 | 4/2016 | Chen et al. | |
| 2016/0262191 A1 | 9/2016 | Flynn et al. | |

FOREIGN PATENT DOCUMENTS

| | | |
|---|---|---|
| DE | 112016001073 | 1/2018 |
| EP | 2031919 | 3/2009 |
| EP | 2034779 | 3/2009 |
| EP | 2424308 | 3/2013 |
| EP | 2688346 | 1/2014 |
| JP | 2009164780 | 7/2009 |
| JP | 2009164780 A2 | 7/2009 |
| JP | 2009164783 | 7/2009 |
| JP | 2009164783 A2 | 7/2009 |
| JP | 2010268330 | 11/2010 |
| JP | 2010268330 A2 | 11/2010 |
| KR | 20030032119 | 10/2010 |
| WO | 2015011710 | 1/2015 |
| WO | 2016048446 | 3/2016 |
| WO | 2016144422 | 9/2016 |

OTHER PUBLICATIONS

Non-Final Office Action issued in U.S. Appl. No. 14/921,481, dated Jul. 13, 2017 in 9 pages.
Notice of Allowance issued in U.S. Appl. No. 14/921,481, dated May 16, 2018 in 6 pages.
Restriction Requirement issued in U.S. Appl. No. 14/921,481, dated Mar. 28, 2017, 6 pages.
International Preliminary Report on Patentability issued in PCT Application No. PCT/US2016/012878, dated Sep. 21, 2017 in 11 pages.
International Search Report and Written Opinion issued in PCT Application No. PCT/US2016/012878, dated Jun. 8, 2016 in 16 pages.
Invitation to Pay Additional Fees and Partial Search Report issued in PCT Application No. PCT/US2016/012878, dated Mar. 31, 2016 in 7 pages.
ROC (Taiwan) Patent Application No. 104127996, Translation of Replacement Claims (Dec. 20, 2016) in 8 pages.
Korean Intellectual Property Office, "Notice of Preliminary Rejection" [translation], dated Feb. 13, 2018 in 13 pages.
Non-Final Office Action issued in U.S. Appl. No. 16/122,131, dated Oct. 31, 2019 in 13 pages.

* cited by examiner

API FOR WEB ACCESS DIRECTLY OR THROUGH INTERMEDIARY

CLAIM OF PRIORITY

The present application claims the benefit of U.S. Provisional Application No. 62/044,929, filed Sep. 2, 2014, which is hereby incorporated by reference for all purposes.

BACKGROUND

In computer networks, a proxy server is a server (a computer system or an application) that can act on behalf of clients seeking resources from other servers. A client connects to the proxy server, requesting some service, such as a file, connection, web page, or other resource available from a different server. The proxy server evaluates the request as a way to simplify and control its complexity. Today, most proxies are web proxies, facilitating access to content on the World Wide Web and providing anonymity.

Although proxy servers can provide utility, the use of proxy server can sometimes be cumbersome. The diversion or interception of a transport control protocol (TCP) connection can create issues. For example, it might not be possible to communicate, to a proxy, an original destination Internet Protocol (IP) address and port if a gateway and a proxy reside on different hosts. Further, the user of a proxy server still requires an access to the Internet, which may not always be possible or optimal.

BRIEF SUMMARY

Embodiments can enable application processes executing on a mobile device to interact with interfaces (e.g., routines of an application programming interface) exposed on that mobile device in order to establish a wireless connection either directly to a network (e.g., the Internet) or to an intermediary device through which the application processes can then communicate with the network indirectly. The intermediary device can communicate with the network on behalf of the mobile device. As examples, the API can make a determination of whether to connect to the network or to connect to the intermediary device. The determination may be dynamic by assessing current state variables of the mobile device and/or the intermediary. The application processes can remain unaware, in either case, of whether the interfaces are communicating with the network through the intermediary device or not.

In some embodiments, the connection between the mobile device and the intermediary device can be a local connection (not through the Internet) and may be a peer-to-peer connection. A command to the intermediary can be packaged as a procedure call. For example, the mobile device can package an HTTP request into a procedure call, and then send the procedure call to the intermediary device, which acts on the procedure call to form an HTTP request to the requested server.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
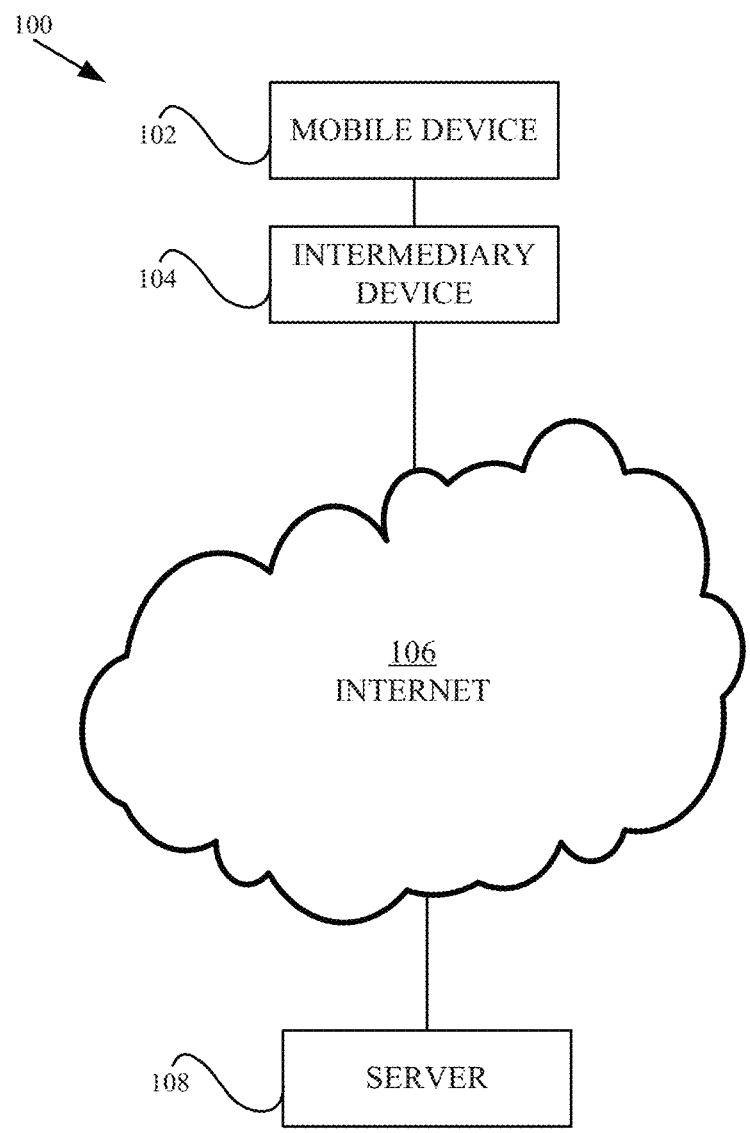
FIG. 1 is a block diagram that illustrates an example of a system in which a mobile device communicates over the Internet with a server through an intermediary device, according to some embodiments.

Embodiments can provide a programming interface for an application to call for access to a server, where a routine of the interface can determine among options for how to obtain the data from the specified sever. As an example for providing different options for a mobile device to communicate with a server over the Internet, a daemon process executing on the mobile device can establish different types of communication sessions. One type of communication session (a direct-to-Internet communication session) involves the mobile device sending data to and receiving data from the Internet using its own WiFi connection, without the intervention of any intermediary. Another type of communication session (a direct-to-intermediary communication session) involves the mobile device sending data to and receiving data from an intermediary device using a potentially non-WiFi connection, such as a Bluetooth connection. The intermediary device can use its own WiFi connection (or cellular connection or any other connection to the Internet)

to generate an Internet connection to a server based on request information from the mobile device, and to receive the requested data that is then sent to the mobile device over the separate connection to the mobile device.

In some embodiments, routines that the daemon process exposes to the applications executing on the mobile device are not distinguished based on these types of communication sessions. A routine for sending an HTTP request, for example, can expose the same interface to applications regardless of whether that routine will send the HTTP request directly to the Internet or a command referencing the HTTP request to the intermediary device. Thus, applications do not need to be designed to distinguish between these situations. The daemon process can handle such details without express input from the applications. Thus, the use of the intermediary device can be transparent to the application processes, such that the manner in which the application processes transmit and receive data using the interfaces remains the same regardless of whether the intermediary device is involved.

I. Connection to Network

A mobile device, such as an Apple iPod Shuffle, can store application programs that can be updated from time to time. In order to update the application programs that are stored on the mobile device, the mobile device can attempt to communicate with a server on which updated versions of the application programs are contained. Typically, such communication involves the transport of data packets over wireless and/or wired networks including the Internet. If the mobile device is able to communicate with the server, then the server can send the updated application program data to the mobile device over the networks, after which the mobile device can install the data in order to update its application programs.

Such a mobile device might attempt to communicate with a server over the Internet for other reasons. A mobile device might store a web-browsing application that can use the Hypertext Transfer Protocol (HTTP) to communicate with a remote web server over the Internet. Upon establishing a network connection with the Internet, the mobile device can send HTTP requests to the server, and then receive HTTP responses in reply. An HTTP request might identify a specific file, such as a web page, that the server stores. An HTTP response might contain content from that file, which the web-browsing application can display when that content is received at the mobile device.

However, under some circumstances, a mobile device might not currently be able to connect to any network through which the server can be accessed. This lack of network accessibility could be due to a variety of factors. Even if the mobile device is WiFi-capable, the mobile device might not currently be within range of any WiFi access points through which it can access the network wirelessly. Alternatively, the mobile device might currently be within range only of WiFi access points for which the mobile device possesses no access credentials, such as a WiFi Protected Access (WPA) key or a Wireless Equivalent Privacy (WEP) key.

The mobile device might not even be WiFi-capable. Even so, some mobile devices are able to communicate directly with other (potentially mobile) devices through a wired Universal Serial Bus (USB) connection or through a wireless Bluetooth connection. For example, a mobile device might be able to establish a wireless connection to an Apple iPhone using Bluetooth. Such a mobile device might be able to establish a wireless connection to another device even if that mobile device cannot currently establish any WiFi connection. Mobile devices that are not WiFi-capable, but which can establish other kinds of connections to other devices that are WiFi-capable, may sometimes rely upon the WiFi capabilities of the other devices to which they can connect.

FIG. 1 is a block diagram that illustrates an example of a system 100 in which a mobile device communicates over the Internet with a server through an intermediary device, according to some embodiments. As shown in FIG. 1, a mobile device 102 is connected either wirelessly or via a wire to an intermediary device 104. The connection between devices 102 and 104 can be a wireless Bluetooth connection, for example. Such a connection can be considered local as it does not involve any Internet routers. The connection could be any peer to peer connection. In some embodiments, another local intermediate device might exist between mobile device 102 and intermediary device 104, e.g., a local bridge could coordinate communications.

Mobile device 102 can be any of a variety of different kinds of devices, such as, for example, a portable music player, a digital camera, a laptop computer, a tablet computer, a digital audio recorder, enhanced reality goggles, headphones, earpieces, or a smart phone. In some cases, mobile device 102 can be implemented as, or placed inside or attached to a wearable accessory such as a watch, a bracelet, a necklace, a ring, a belt, a jacket, glasses, goggles, headphones, ear buds, a hearing aid, or the like. Although mobile device 102 can be WiFi-capable, mobile device 102 can alternatively be a device that is not WiFi-capable.

In addition to the connection with mobile device 102, intermediary device 104 can establish a connection to the Internet 106. For example, intermediary device 104 can be a WiFi-capable device, such as an Apple iPhone, that can establish a WiFi connection through a WiFi access point (e.g., an Internet-connected network router) to Internet 106. The connection to Internet 106 can be through various other networks, potentially including local area networks and/or wide area networks.

According to the example illustrated in FIG. 1, mobile device 102 can address HTTP requests to a server 108 that is also connected to Internet 106. Mobile device 102 can package these HTTP requests (e.g., to conform to the Bluetooth protocol) and send commands referencing the packaged HTTP requests directly to intermediary device 104 (e.g., over a Bluetooth connection). A command referencing the packaged HTTP request can be sent as a remote call or command to intermediary device 104, e.g., using remote procedure call (RPC) or XPC, which corresponds to XML (Extensible Markup Language) Procedure Call.

An authentication can occur between mobile device 102 and intermediary device 104 before intermediary device 104 will act on a remote call from mobile device 102. Mobile device 102 and intermediary device 104 may be different devices of a same user (e.g., mobile device 102 can be a wearable device and intermediary device 104 can be a mobile phone). The authentication can occur by accessing an identity management server that stores identifiers of the user's devices, which have been registered at the identity management server, for example. These identifiers may be used for authentication. In some embodiments, at a time that the devices are initially being Bluetooth-paired, intermediary device 104 sends, to mobile device 102, a code that mobile device 102 can present to its user. At that time, the user of mobile device 102 can supply the presented code to intermediary device 104 in order to complete the pairing. Intermediary device 104 can, at that time, store an identity of mobile device 102 in an in-memory list of devices with which intermediary device 104 has previously paired. Subsequently, if intermediary device 104 locates the identity of mobile device 102 in this list, then this location can serve as authentication of mobile device 102.

Intermediary device 104 can receive commands that reference the packaged HTTP requests directly from mobile device 102. Intermediary device 104 can unpackage the HTTP requests (e.g., by stripping Bluetooth header information) and send the HTTP requests on toward server 108 through Internet 106. The first segment of the path over which the HTTP requests travel between intermediary device 104 and Internet 106 can be a WiFi connection.

Server 108 can receive HTTP requests transmitted in the above manner. Server 108 can process the HTTP requests and generate HTTP responses that fulfill the HTTP requests. Server 108 can address the HTTP responses to mobile device 102. Server 108 can send the HTTP responses over Internet 106 toward mobile device 102.

Intermediary device 104 can intercept HTTP responses that are addressed to mobile device 102. Intermediary device can receive these HTTP responses over its WiFi connection to Internet 106. Intermediary device 104 can package the HTTP responses (e.g., to conform to the Bluetooth protocol) and transmit the packaged HTTP responses directly over its connection to mobile device 102.

Mobile device 102 can receive the packaged HTTP responses directly from intermediary device 104. Mobile device 102 can unpackage the HTTP responses (e.g., by stripping Bluetooth header information). Mobile device 102 can then use the contents of the HTTP responses in various ways. In this manner, mobile device 102 can conduct HTTP communications with server 108 using the WiFi capabilities of intermediary device 104.

Under some circumstances, if a mobile device is WiFi-capable, then the mobile device can communicate wirelessly over the Internet without using any intermediary device's WiFi connection. This can be the case even if the mobile device can currently establish a wireless connection with the intermediary device. However, the fact that a mobile device is WiFi-capable does not preclude that mobile device from using the WiFi services of an intermediary device when warranted for various reasons.

Figure 2:
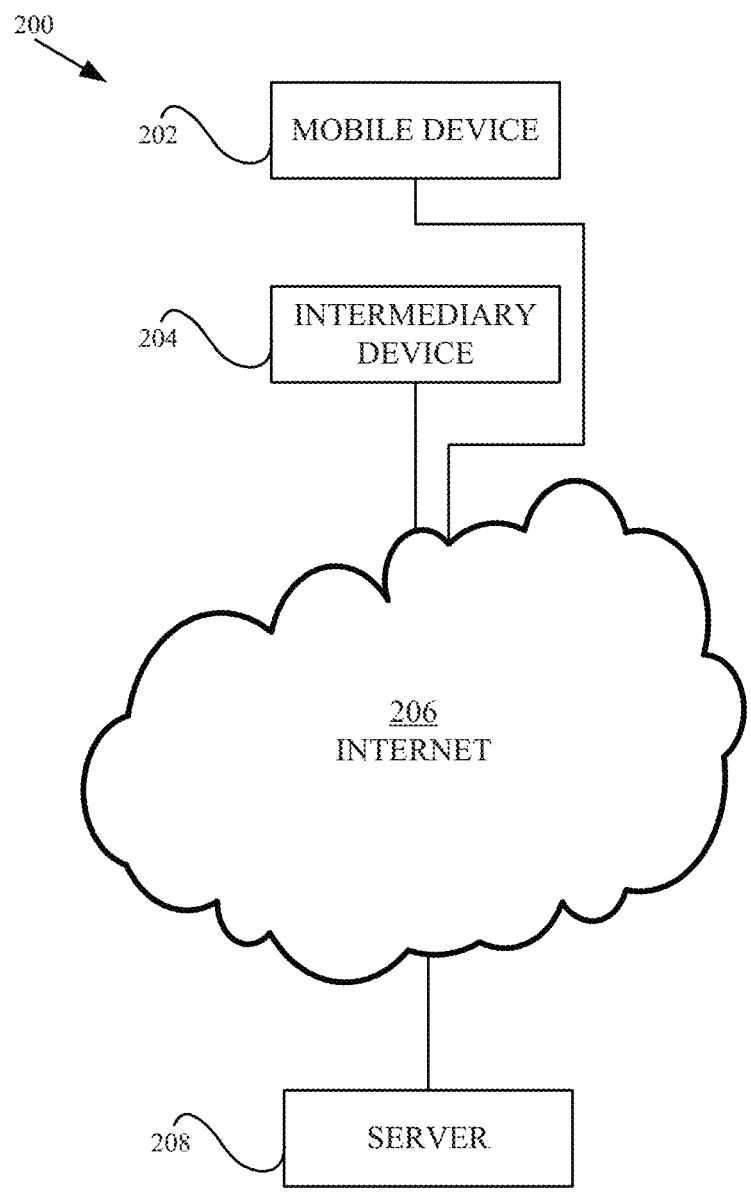
FIG. 2 is a block diagram that illustrates an example of a system in which a mobile device communicates over the Internet with a server without the aid of an intermediary device, according to some embodiments.

FIG. 2 is a block diagram that illustrates an example of a system 200 in which a mobile device communicates over the Internet with a server without the aid of an intermediary device, according to some embodiments. As shown in FIG. 2, a mobile device 202 is connected wirelessly to Internet 206. An intermediary device 204 is also connected wirelessly to Internet 206. The connections of mobile device 202 to Internet 206 and of intermediary device 204 to Internet 206 can be WiFi connections.

In the example of FIG. 2, mobile device 202 does not necessarily establish a Bluetooth or any other kind of connection with intermediary device 204, even though mobile device 202 may be capable of establishing a wireless connection with intermediary device 204. Thus, in the example illustrated, mobile device 202 communicates through Internet 206 without those communications passing through intermediary device 204.

Mobile device 202 can be a kind of device similar to mobile device 102 of FIG. 1. However, mobile device 202 is WiFi-capable. Mobile device 202 can establish a WiFi connection through a WiFi access point (e.g., an Internet-connected network router) to Internet 206. The connection to Internet 206 can be through various other networks, potentially including local area networks and/or wide area networks. Intermediary device 204 can be a kind of device similar to intermediary device 104 of FIG. 1.

According to the example illustrated in FIG. 2, mobile device 202 can address HTTP requests to a server 208 that is also connected to Internet 206. Mobile device 202 has no need to package these HTTP requests; mobile device 202 can send the HTTP requests directly (without the intervention of intermediary device 204) into Internet 206 toward server 208.

Server 208 can receive HTTP requests sent in the above manner. Server 208 can process the HTTP requests and generate HTTP responses that fulfill the HTTP requests. Server 208 can address the HTTP responses to mobile device 202. Server 208 can send the HTTP responses over Internet 206 toward mobile device 202.

Mobile device 202 can receive the HTTP responses directly (without the intervention of intermediary device 204) out of Internet 206. Mobile device 202 can then use the contents of the HTTP responses in various ways. In this manner, mobile device 202 can conduct HTTP communications with server 208 without using the WiFi capabilities of intermediary device 204.

Thus, two different types of communications channels are described above-one involving an intermediary device uses its WiFi connection on behalf of a mobile device to communicate over the Internet, and one involving a mobile device that uses its own WiFi connection to communicate over the Internet. According to techniques described below, in some embodiments, the particular type of communication channel that applications executing on the mobile device use to communicate over the Internet can be concealed from those applications. Consequently, the applications do not need to be programmed to account for details involving the types of communication channels that they use; the communication mechanisms can be abstracted to the applications, insulating the applications from such details.

II. Abstraction Through API

In some embodiments, an application programming interface exposes routines that applications can call in order to communicate over the Internet. These routines can be implemented by a daemon process that executes on the same mobile device on which the applications execute. In some embodiments, the applications call the same routines to engage in communications over the Internet regardless of whether the mobile device wirelessly connects directly to the Internet (as illustrated in FIG. 2) or uses the WiFi services of an intermediary device to connect to the Internet (as illustrated in FIG. 1). The routines can be specifically designed to communicate HTTP requests and responses. In some embodiments, the applications call the routines using remote procedure calls (RPCs).

Figure 3:
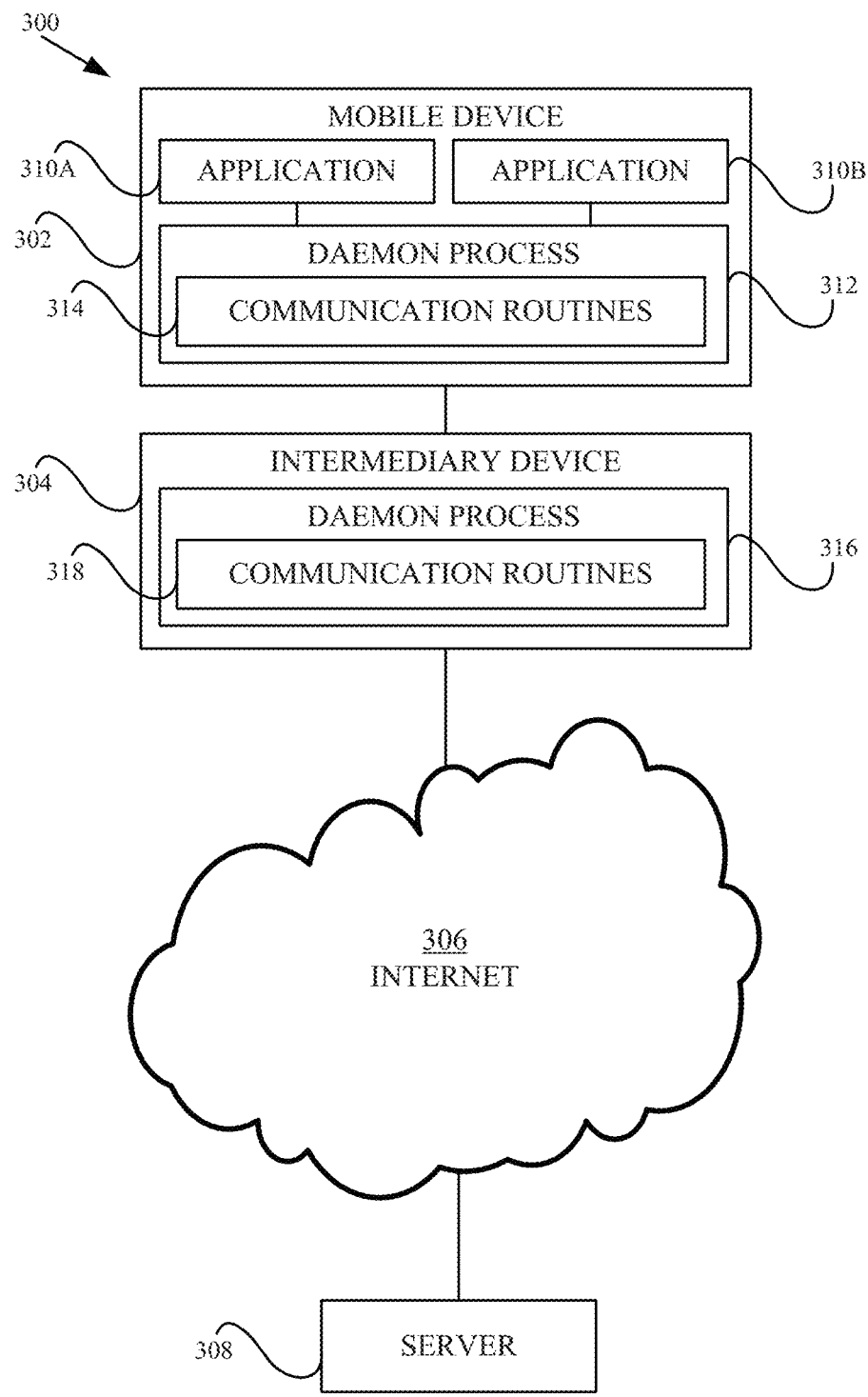
FIG. 3 is a block diagram that illustrates an example of a system in which a mobile device executes a daemon process that exposes routines that abstract details regarding whether HTTP communications originating from applications on the mobile device will be direct to the Internet or through an intermediary device, according to some embodiments.

FIG. 3 is a block diagram that illustrates an example of a system 300 in which a mobile device executes a daemon process that exposes routines that abstract details regarding whether HTTP communications originating from applications on the mobile device will be direct to the Internet or through an intermediary device, according to some embodiments. As shown in FIG. 3, a mobile device 302 can be connected, wirelessly or by wire, to intermediary device 304. For example, mobile device 302 can establish a Bluetooth connection with intermediary device 304. Intermediary device 304 is connected wirelessly to Internet 306 through a WiFi connection. In some embodiments, the connection between mobile device 302 and intermediary device 304 is local, and not through Internet 306.

Mobile device 302 can be a kind of device similar to mobile device 202 of FIG. 2. Although mobile device 302 is illustrated as connecting to intermediary device 304, mobile device 302 also can establish a WiFi connection through a WiFi access point (e.g., an Internet-connected network router) to Internet 306. The connection to Internet 306 can be through various other networks, potentially including local area networks and/or wide area networks. Intermediary device 304 can be a kind of device similar to intermediary device 204 of FIG. 2.

In the example illustrated, mobile device 302 stores and executes applications 310A and 310B. These can be different kinds of applications. Both applications 310A and 310B can be capable of sending HTTP requests and receiving HTTP responses. Although two applications are illustrated in FIG. 3 for reasons of simplicity, various embodiments may involve various different numbers of applications executing concurrently on mobile device 302.

A daemon process 312 also executes on mobile device 302. Daemon process 312 includes communication routines 314. Communication routines 314 can expose, to applications 310A and 310B, interfaces through which applications 310A and 310B can make calls to invoke various functions of communication routines 314. Different routines can have different interfaces that all belong to an application programming interface that daemon process 312 implements. The interfaces can be characterized by names, input parameters, and return types, for example. Documentation regarding the details of the application programming interface can be published to software developers, who can then develop applications such as applications 310A and 310B to make use of the functions provided by making calls to the routines.

In some embodiments, communication routines 314 include a particular routine that can be called in order to configure the behavior of others of communication routines 314. Specifically, the particular routine can be called in order to express the type of connection (e.g., through or without an intermediary device) that the others of the communication routines are to employ when sending and receiving HTTP requests and responses. In some embodiments, though, such express configuration can be obviated by dynamic decision-making on the part of daemon process 312, as will be discussed in greater detail below.

In some embodiments, based on whether a connection between mobile device 302 and intermediary device 304 exists, communication routines 314 can establish a session directly between mobile device 302 and Internet 306 in response to an invocation of (or other call to) communication routines 314 by application process 310A or 310B. Under such circumstances, application process 310A or 310B can invoke (or otherwise call) communication routines 314 to cause communication routines 314 to transmit data from mobile device 302 directly to Internet 306 over that session.

Continuing the above scenario, communication routines 314 can receive data directly from the Internet 306 through the session. Communication routines 314 can send, to appropriate ones of application processes 310A and 310B, the data received directly from Internet 306 through the session.

Intermediary device 304 executes a daemon process 316. In some embodiments, daemon process 316 and daemon process 312 can be executed from identical program code, but may be configured to behave differently during execution. Daemon process 316 includes communication routines 318. Daemon process 312 can communicate wirelessly with daemon process 316 through communication routines 314. Daemon process 316 can communicate wirelessly with daemon process 312 through communication routines 318.

Intermediary device 304 is connected to Internet 306 through a WiFi connection that intermediary device 304 establishes to Internet 306. Intermediary device 304 can send HTTP requests, and receive HTTP responses, over this WiFi connection through daemon process 316 and communication routines 318 thereof.

In some embodiments, based on whether a connection between mobile device 302 and intermediary device 304 exists, communication routines 314 can establish a session directly between mobile device 302 and intermediary device 304. For example, communication routines 314 can establish a Bluetooth connection between mobile device 302 and intermediary device 304, and conduct the session over this connection. Communication routines 314 can establish such a session with intermediary device 304 in response to an invocation of (or other call to) communication routines 314 by application process 310A or 310B.

In some embodiments, communication routines 314 can establish the session with intermediary device 304 in response to communication routines 314 dynamically determining (e.g., based on factors discussed in greater detail below) that the session is to be established between mobile device 302 and intermediary device 304 rather than directly from mobile device 302 to Internet 306.

Under such circumstances, application process 310A or 310B can invoke (or otherwise call) communication routines 314 to cause communication routines 314 to transmit, from mobile device 302 directly to intermediary device 304 over the session, data destined for Internet 306. Communication routines 314 can package the data to be transmitted (e.g., to conform to the Bluetooth protocol) prior to transmitting the packaged data to intermediary device 306.

In some embodiments, when daemon process 316 receives data transmitted from communication routines 314 over the connection between mobile device 302 and intermediary device 304, daemon process 316 transmits that data over its WiFi connection to Internet 306, toward server 308 (assuming that the data are addressed to server 308). Prior to transmitting the data, daemon process 316 can unpackage (e.g., by stripping Bluetooth header information) the data if the data were packaged for transmission to intermediary device 304.

Intermediary device 314, and more specifically daemon process 316, also can receive data through its WiFi connection to Internet 306. Such data can originate from server 308, for example, and can be responsive to data that mobile device 302 previously sent toward server 308 using the WiFi services of intermediary device 304. In response to receiving such data, daemon process 316 can transmit the data over its session with mobile device 302. Prior to transmitting the data, daemon process 316 can package the data (e.g., to conform to the Bluetooth protocol).

Continuing the above scenario, daemon process 312 can receive, through communication routines 314, data that intermediary device 304 received from Internet 306 and transmitted to mobile device 302. Daemon process 312 can send, to appropriate ones of applications 310A and 310B, the data that intermediary device 304 received from the network through the second session.

In some embodiments, the specific routine within communication routines 314 that applications 310A and 310B call in order to send an HTTP request toward server 308 (or any other destination across Internet 306) is the same routine regardless of whether that HTTP request will be passed through intermediary device 304 before reaching Internet 306. In some embodiments, the specific routine within communication routines 314 that transmits HTTP responses to applications 310A and 310B is the same routine regardless of whether that HTTP response was passed through intermediary device 304 before reaching mobile device 302.

The factors that daemon process 312 uses to determine whether to communicate with Internet 306 directly or through intermediary device 304 can include the presence or absence of an existing wireless connection between mobile device 302 and Internet 306. In some embodiments, daemon process 312 uses a direct connection to Internet 306 when possible, and otherwise uses a connection with intermediary device 304.

Figure 4:
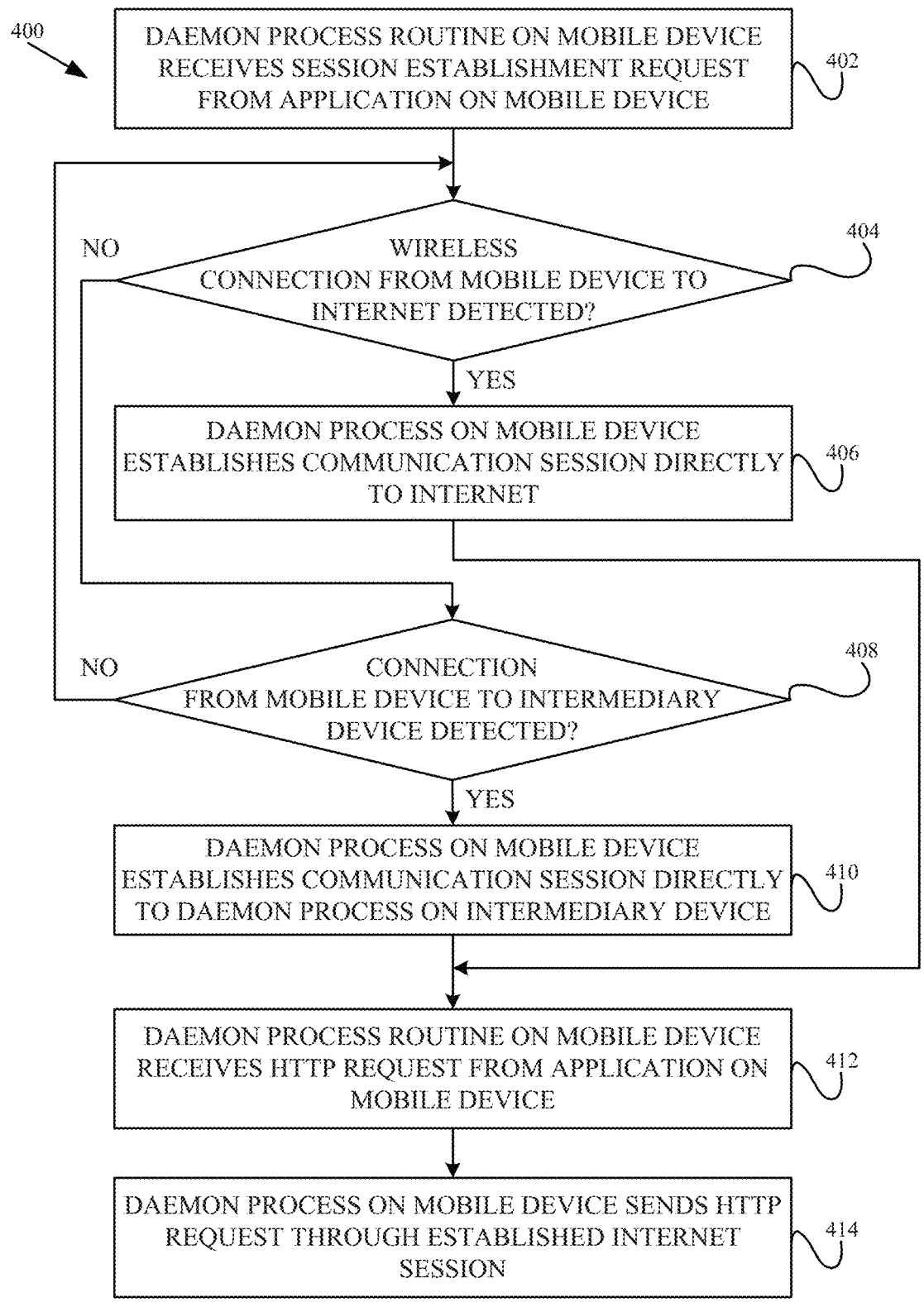
FIG. 4 is a flow diagram that illustrates an example of a technique for dynamically selecting between a direct WiFi connection to the Internet and a Bluetooth (or other) connection to an intermediary device, according to some embodiments.

FIG. 4 is a flow diagram that illustrates an example of a technique 400 for dynamically selecting between a direct WiFi connection to the Internet and a Bluetooth (or other) connection to an intermediary device, according to some embodiments. Although the example technique involves operations being performed in a specific order, variants of the technique according to some embodiments can involve these or different operations being performed in different orders. In some embodiments, daemon process 312 of FIG. 3 includes code for performing technique 400, but application processes 310A and 310B of FIG. 3 do not.

In block 402, a daemon process routine on a mobile device receives a session establishment request from an application on the mobile device. For example, referring to FIG. 3, a routine of daemon process 312 can receive a session establishment request from application 310A.

In block 404, in response to receiving the request, the daemon process on the mobile device determines whether a wireless connection from the mobile device to the Internet is currently detected. For example, daemon process 312 can determine whether mobile device 312 currently has a WiFi connection to Internet 306 (or to a WiFi access point through which Internet 306 is accessible). If the daemon process currently detects a wireless connection to the Internet, then the daemon process begins to establish a direct-to-Internet communication session in block 406. Otherwise, the daemon process performs a further determination in block 408.

In block 408, in response to detecting a wireless connection to the Internet, the daemon process on the mobile device establishes a communication session directly with the Internet. For example, daemon process 312 can establish a direct-to-Internet communication session over a WiFi connection between mobile device 302 and Internet 306, omitting intermediary device 304. The daemon process can then begin to process HTTP communications from applications in block 412.

Alternatively, in block 410, in response to detecting no wireless connection to the Internet, the daemon process on the mobile device determines whether a connection from the mobile device to the intermediary device is currently detected. For example, daemon process 312 can determine whether mobile device 312 currently has a Bluetooth connection, a USB connection, or some other connection to intermediary device 304. If the daemon process currently detects a connection to the intermediary device, then the daemon process begins to establish a direct-to-intermediary device communication session in block 410. Otherwise, the daemon process performs a further determination back in block 404.

In block 410, in response to detecting a connection to the intermediary device, the daemon process on the mobile device establishes a communication session directly with the intermediary device. For example, daemon process 312 can establish a direct-to-intermediary device communication session over a Bluetooth, USB, or other connection between mobile device 302 and intermediary device 304. The daemon process can then begin to process HTTP communications from applications in block 412.

In block 412, after establishing a communication session in either block 406 or block 410, the daemon process on the mobile device receives an HTTP request from an application executing on the mobile device. For example, daemon process 312 can receive an HTTP request from application 310A due to application 310A calling one of routines in communication routines 314. The HTTP request can be destined for server 308, for example.

In block 414, in response to receiving the HTTP request, the daemon process on the mobile device (and more specifically the routines thereof) sends the HTTP request, or a command referencing the HTTP request, through the communication session previously established in either block 406 or block 410. Depending on the communication session established, the application's call to the routine in communication routines 314 can result in daemon process 312 sending the HTTP request directly to Internet 306 over a WiFi connection or as a reference within a command to intermediary device 304 over a potentially non-WiFi connection for subsequent delivery through Internet 306.

III. Express Selection of Intermediary Mode by Application

As is discussed above, and referring again to FIG. 3, in some embodiments, communication routines 314 include a particular routine that can be called in order to configure the behavior of others of communication routines 314. Specifically, the particular routine can be called in order to express the type of connection (e.g., through or without an intermediary device) that the others of the communication routines are to employ when sending and receiving HTTP requests and responses.

Figure 5:
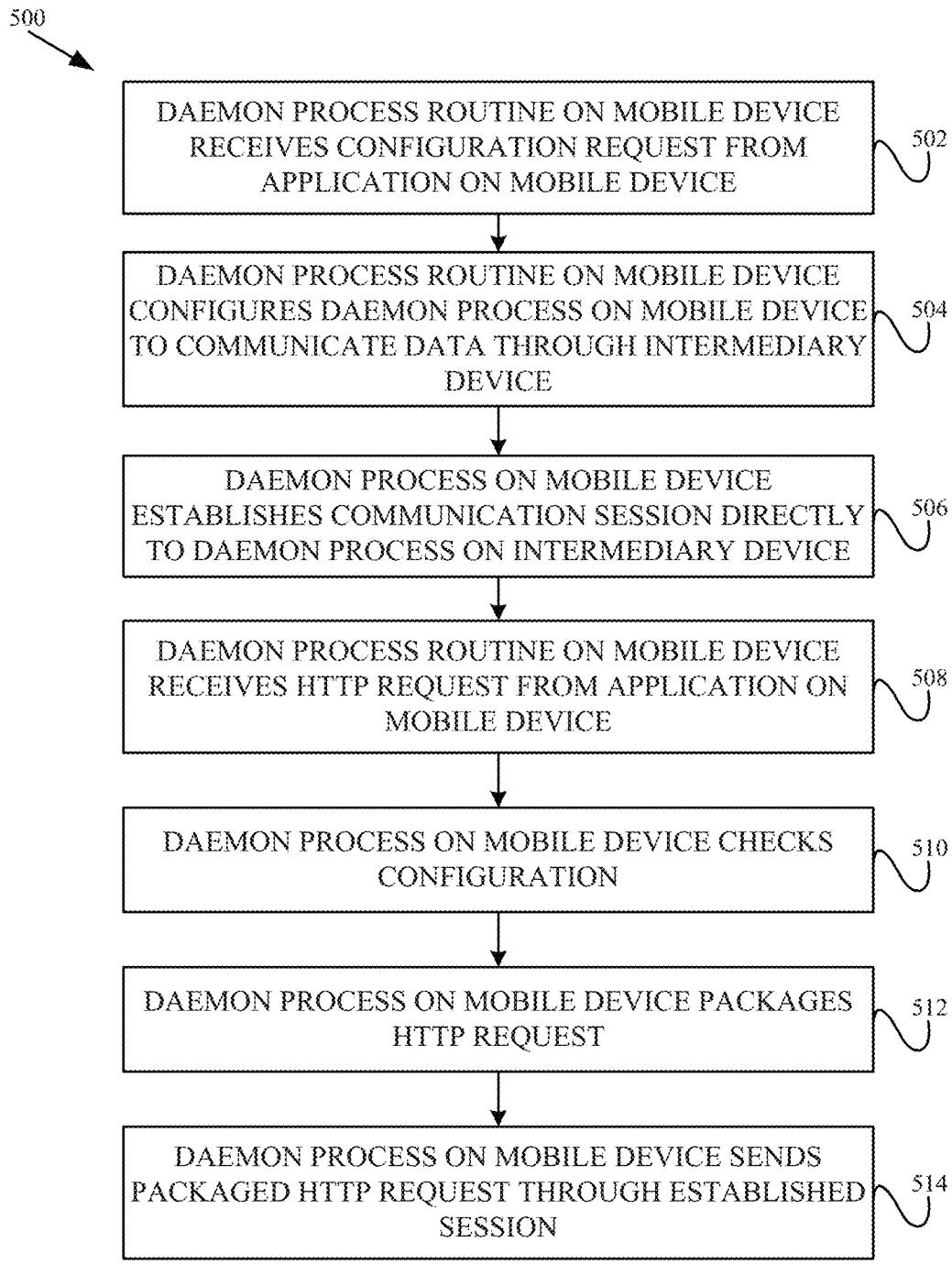
FIG. 5 is a flow diagram that illustrates an example of a technique for expressly designating that a Bluetooth (or other) connection to an intermediary device is to be used for HTTP communications, according to some embodiments.

FIG. 5 is a flow diagram that illustrates an example of a technique 500 for expressly designating that a Bluetooth (or other) connection to an intermediary device is to be used for HTTP communications, according to some embodiments. Although the example technique involves operations being performed in a specific order, variants of the technique according to some embodiments can involve these or different operations being performed in different orders.

In block 502, a daemon process routine on a mobile device receives a configuration request from an application executing on the mobile device. In some embodiments, the configuration request additionally identifies a specific intermediary device whose WiFi services are to be used. For example, referring to FIG. 3, application 310A can call a particular routine within communication routines 314. The particular routine can be designed specifically for the purpose of configuring the type of communication session with be used. Application 310A can pass an identity of the intermediary device as the value of a parameter of the particular routine.

In block 504, the daemon process routine configures the daemon process on the mobile device to communicate data through an intermediary device. For example, in response to the call of the particular routine, the particular routine can store configuration data that indicates that communication sessions subsequently established by communication routines 314 are to be direct-to-intermediary device sessions rather than direct-to-Internet sessions. The configuration data can identify the specific intermediary device with which such sessions are to be established. Others of communication routines 314 can subsequently read this configuration data at session establishment time and can behave accordingly.

In block 506, the daemon process on the mobile device establishes a communication session directly with the daemon process on the intermediary device. For example, daemon process 312 can establish a communication session directly with daemon process 316 over a Bluetooth, USB, or other connection.

In block 508, a daemon process routine on the mobile device receives an HTTP request from the application executing on the mobile device. For example, application 310A can call a routine within communication routines 314. Application 310A can pass, as a value of a parameter of the routine, a pointer to a location in memory at which an HTTP request is stored. The routine thereby receives the HTTP request.

In block 510, the daemon process on the mobile device checks the configuration. For example, daemon process 312 can read configuration data that was stored in block 504 to ascertain that HTTP communications are to be sent and received over a connection having a particular type (e.g., Bluetooth), which might not be a WiFi connection.

In block 512, the daemon process on the mobile device packages the HTTP request. For example, daemon process 312 can package the HTTP request to conform to a protocol (e.g., Bluetooth) identified within the configuration data. Such packaging might not be performed if the session were, instead, a direct-to-Internet session over a WiFi connection.

In block 514, the daemon process on the mobile device sends the packaged HTTP request through the established session. For example, daemon process 312 can send the packaged HTTP request to intermediary device 314 for subsequent delivery over Internet 306 to the HTTP request's destination.

IV. Automatic Selection Between Direct Mode and Intermediary Mode by API Routines As is discussed above, in some embodiments, no express configuration to use a particular session type is required. Instead, the session type to be used can be determined through dynamic decision-making on the part of the daemon process on the mobile device, In making these decisions, the daemon process on the mobile device potentially can act in consultation with the daemon process on the intermediary device.

Discussed below are techniques through which the dynamic and automatic selection of a communication session type (direct-to-Internet or direct-to-intermediary device) can be performed initially, before any session has been established, and subsequently, during the existence of an already established session.

A. Initial Selection at Session Establishment

A daemon process on the mobile device can dynamically and automatically select a communication session type prior to commencing HTTP communications. The daemon process can make this selection based on numerous different factors. Such factors can include various attributes of the current state of the mobile device, some of which are discussed in further detail below.

Figure 6:
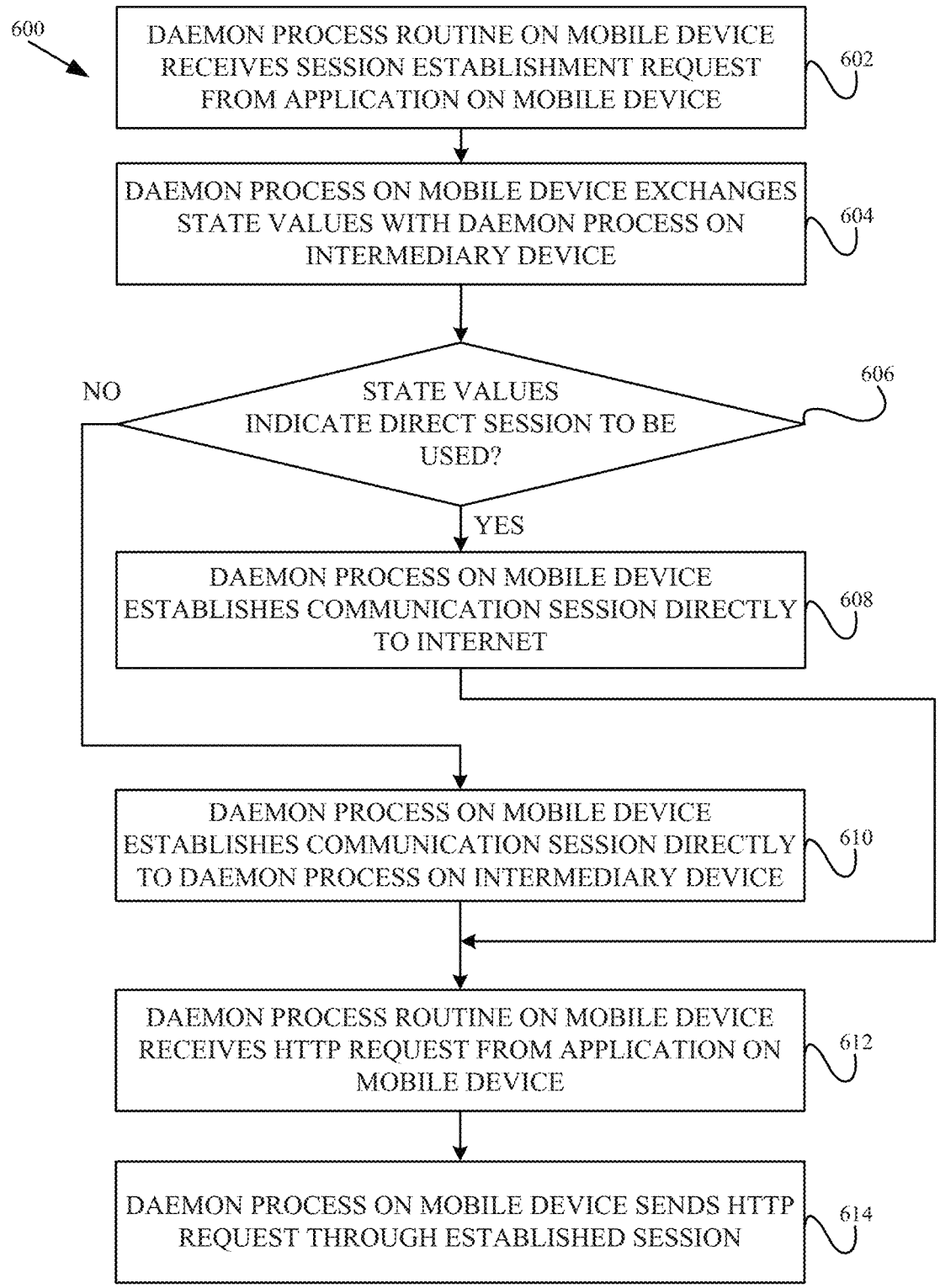
FIG. 6 is a flow diagram that illustrates an example of a technique for dynamically and automatically selecting between a direct-to-Internet communication session and a direct-to-intermediary device communication session initially, before a session of either type has been established, according to some embodiments.

FIG. 6 is a flow diagram that illustrates an example of a technique 600 for dynamically and automatically selecting between a direct-to-Internet communication session and a direct-to-intermediary device communication session initially, before a session of either type has been established, according to some embodiments. Although the example technique involves operations being performed in a specific order, variants of the technique according to some embodiments can involve these or different operations being performed in different orders.

In block 602, a daemon process routine on a mobile device receives a session establishment request from an application executing on the mobile device. For example, referring to FIG. 3, application 310A can call a routine within communication routines 314. The routine can be designed specifically for the purpose of establishing a new communication session (of no specific type).

In block 604, in response to the receipt of the session establishment request, the daemon process routine on the mobile device exchanges state values with a daemon process on the intermediary device. The daemon processes can exchange the state values using any existing wired or wireless connection between the devices. The state values that each device sends to the other indicate values of various current attributes of the sending device's state. Some of these attributes are discussed in greater detail below.

In block 606, the daemon process on the mobile device determines, based on its own current state values and those of the intermediary device, whether a direct-to-Internet session or a direct-to-intermediary device session is to be established. For example, daemon process 312 can input the state values into a set of stored rules in order to produce a result that indicates the type of session with be established. Such rules can compare state values of the mobile device to specified thresholds, and/or to state values of the intermediary device, among other possibilities, for example. If the daemon process determines that a direct-to-Internet session is to be established, then the daemon process begins to establish that type of session in block 608. Otherwise, the daemon process begins to establish the other type of session in block 610.

In block 608, the daemon process on the mobile device establishes a communication session directly with the Internet over a WiFi connection. For example, daemon process 312 can establish a session directly with Internet 306 over a WiFi connection. The connection does not involve intermediary device 314. The daemon process on the mobile device can then begin to process HTTP requests from applications in block 612.

Alternatively, in block 610, the daemon process on the mobile device establishes a communication session directly with the daemon process on the intermediary device over a potentially non-WiFi connection. For example, daemon process 312 can establish a session directly with daemon process 316 over a Bluetooth connection. The daemon process on the mobile device can then begin to process HTTP requests from applications in block 612.

In block 612, a daemon process routine on the mobile device receives an HTTP request from an application executing on the mobile device. For example, application 310A can call a routine within communication routines 314. Application 310A can pass, as a value of a parameter of the routine, a pointer to a location in memory at which an HTTP request is stored. The routine thereby receives the HTTP request.

In block 614, the daemon process on the mobile device sends the HTTP request through the established session. For example, daemon process 312 can send the HTTP request directly to Internet 306 or to intermediary device 314 for subsequent delivery over Internet 306, depending upon the type of communication session that was established. In either case, elements subsequently receiving the HTTP request can move the HTTP request toward the HTTP request's destination.

B. Subsequent Re-Selection During Established Session

In some embodiments, even after a session of one type has been established, and after one or more HTTP requests and/or HTTP responses have been communicated through that session, the daemon processes can collaborate in order to determine that further HTTP requests and/or HTTP responses will be communicated through a session of the other type. A change in state of the mobile device and/or the intermediary device can suggest that the other type of session has become more appropriate for the current circumstances.

In some embodiments, the mobile device and the intermediary devices periodically (e.g., after each passage of a time interval of a specified duration, or after each occurrence of a specified event such as an HTTP communication) exchange state values with each other during an existing session. After each exchange, the mobile device can use the most recent state values to re-evaluate whether the current session type should be continued, or whether a session of the other type should be employed at that moment instead.

Figure 7:
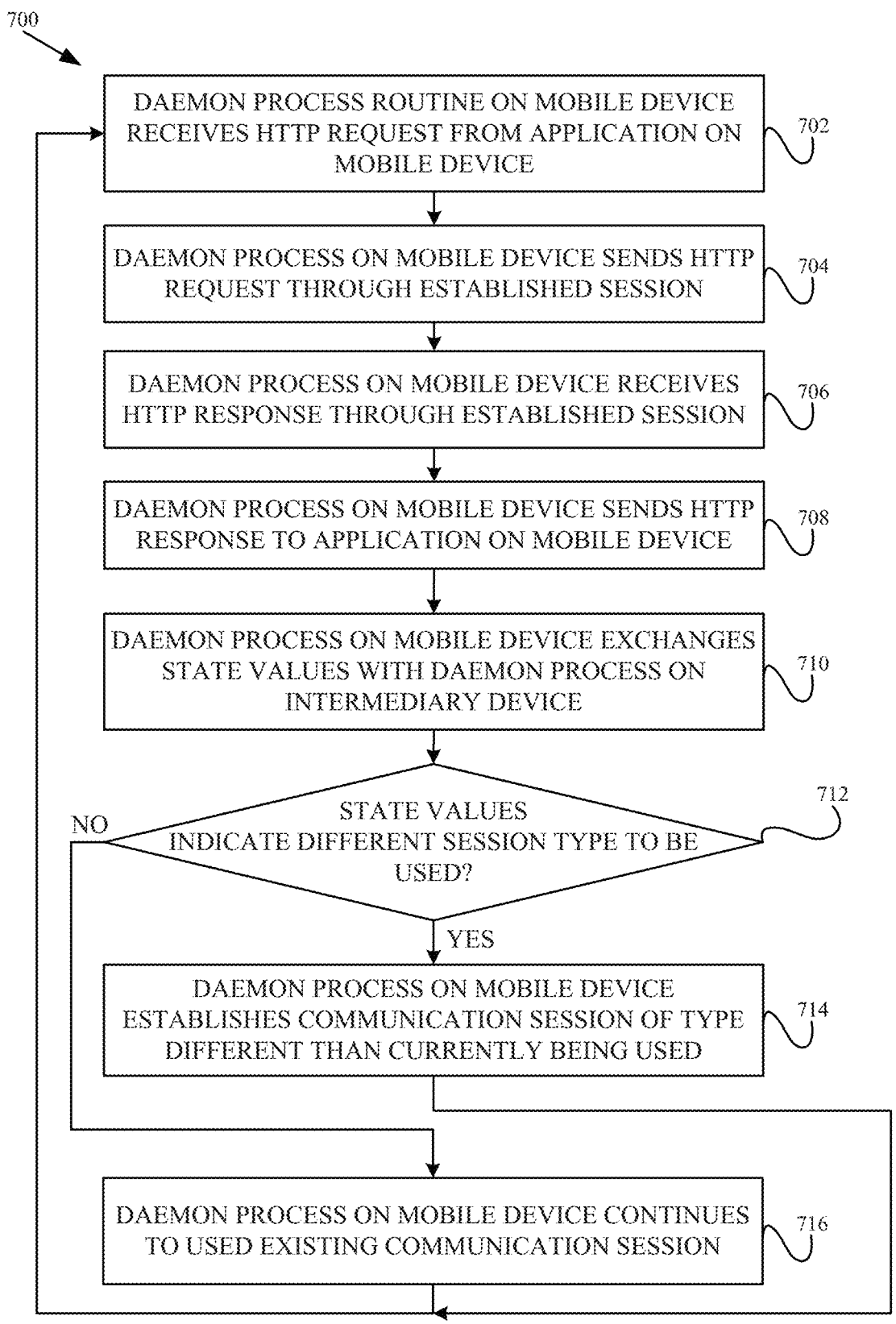
FIG. 7 is a flow diagram that illustrates an example of a technique for dynamically and automatically selecting between a direct-to-Internet communication session and a direct-to-intermediary device communication session periodically, while a session of either type is being used, according to some embodiments.

FIG. 7 is a flow diagram that illustrates an example of a technique 700 for dynamically and automatically selecting between a direct-to-Internet communication session and a direct-to-intermediary device communication session periodically, while a session of either type is being used, according to some embodiments. Although the example technique involves operations being performed in a specific order, variants of the technique according to some embodiments can involve these or different operations being performed in different orders.

In block 702, a daemon process routine on a mobile device receives an HTTP request from an application executing on the mobile device. For example, referring to FIG. 3, application 310A can call a routine within communication routines 314. Application 310A can pass, as a value of a parameter of the routine, a pointer to a location in memory at which an HTTP request is stored. The routine thereby receives the HTTP request.

In block 704, the daemon process on the mobile device sends the HTTP request through an established session. For example, daemon process 312 can send the HTTP request directly to Internet 306 or directly to intermediary device 314 for subsequent delivery over Internet 306, depending upon the type of communication session that was previously established. In either case, elements subsequently receiving the HTTP request can move the HTTP request toward the HTTP request's destination.

In block 706, the daemon process on the mobile device receives an HTTP response through the established session. For example, daemon process 312 can receive the HTTP response directly from Internet 306 or directly from intermediary device 314, depending upon the type of communication session that was previously established.

In block 708, the daemon process on the mobile device sends the HTTP response to an application executing on the mobile device. For example, assuming that the HTTP response is destined for application 310A, daemon process 312 can transmit the HTTP response to application 310A. The application thereby receives the HTTP response.

In block 710, the daemon process on the mobile device exchanges state values with a daemon process on the intermediary device. The daemon processes can exchange the state values using any existing wired or wireless connection between the devices. The state values that each device sends to the other indicate values of various current attributes of the sending device's state. Some of these attributes are discussed in greater detail below. In some embodiments, the exchange can be performed after each passage of an interval of time of a specified duration. In some embodiments, the exchange can be performed after each occurrence of an event of a specified type (e.g., the sending of an HTTP request and/or the receipt of an HTTP response).

In block 712, the daemon process on the mobile device determines, based on its own current state values and those of the intermediary device, whether a different session type than the one current in use is to be established. For example, daemon process 312 can input the state values into a set of stored rules in order to produce a result that indicates the type of session with be used. Such rules can compare state values of the mobile device to specified thresholds, and/or to state values of the intermediary device, among other possibilities, for example. If the daemon process determines that the type of session with be used differs from the type of session that is currently being used, then the daemon process begins to establish that different type of session in block 714. Otherwise, the daemon process continues to use the current type of session in block 716.

In block 714, in response to determining that a different session type is to be used, the daemon process on the mobile device establishes a communication session of a type that differs from the type previously being used. For example, daemon process 312 can establish a new session directly with Internet 306 over a WiFi connection if the existing session was directly to intermediary device 304. In some embodiments, the daemon process can tear down the previous session after establishing the new session. The daemon process on the mobile device can then continue to process HTTP requests from applications back in block 702.

Alternatively, in block 712, in response to determining that a different session type is to be used, the daemon process on the mobile device continues to use the existing session. For example, daemon process 312 can continue to use a session directly with daemon process 316 over a Bluetooth connection. The daemon process on the mobile device can then continue to process HTTP requests from applications back in block 702.

C. Factors Used in Selection and Re-Selection

As is discussed above in connection with FIGS. 6 and 7, a daemon process on a mobile device can dynamically select, based its own state values and those of an intermediary device, whether HTTP communications are to be conducted using a direct-to-Internet session or a direct-to-intermediary device session. The daemon process can perform this selection without any input from or notice to any applications executing on the mobile device; these applications can transact HTTP communications through the daemon process without any awareness of the specific type of communication session that is being used.

Some specific factors that the daemon process on the mobile device can use in making this determination are now discussed. These factors are just some examples of a multitude of different factors upon which the determination could be based. Different combinations of these and other factors could be used to make the determination. The discussion below is not necessarily exhaustive.

1. Originating Device's Network Connectivity

In some embodiments, as is discussed above in connection with FIG. 4, a daemon process on the mobile device determines the type of communication session with be used based on whether the mobile device currently has a WiFi connection to a network. In such embodiments, the daemon process can establish or transition to a direct-to-Internet communication session in response to detecting that the mobile device currently has WiFi Internet connectivity. Conversely, in such embodiments, the daemon process can establish or transition to a direct-to-intermediary device communication session in response to detecting that the mobile device currently lacks WiFi Internet connectivity.

2. Detected WiFi Signal Strength

In some embodiments, the mere detection of the mobile device's WiFi connectivity is not necessarily sufficient for the mobile device's daemon process to conclude that a direct-to-Internet communication session is to be used. In some embodiments, the daemon process on the mobile device measures the current WiFi signal strength (e.g., in decibels). The daemon process can compare this signal strength to a specified threshold value. If the measured signal strength is less than the specified threshold value, then the daemon process can establish or transition to a direct-to-intermediary device communication session; the mobile device's own WiFi capability might be insufficient. Alternatively, if the measured signal strength is greater than or equal to the specified threshold value, then the daemon process can establish or transition to a direct-to-Internet communication session.

As is discussed above, in some embodiments, a mobile device and an intermediary device can periodically exchange state values. These state values can include current WiFi signal strengths measured by each of the devices. In some embodiments, the daemon process on the mobile device compares the WiFi signal strength of the intermediary device to its own WiFi signal strength. If the intermediary device's signal strength is greater than the mobile device's signal strength, then the daemon process can establish or transition to a direct-to-intermediary device communication session; the mobile device's own WiFi capability might be inferior to that of the intermediary device. Alternatively, if the intermediary device's signal strength is less than or equal to the mobile device's signal strength, then the daemon process can establish or transition to a direct-to-Internet communication session; the mobile device's own WiFi capability might be superior to that of the intermediary device.

3. Comparative Electrical Power States of Originating and Intermediary Devices The factors discussed above largely relate to wireless communication capability. However, a daemon process also may consider other factors in selecting between communication session types. Some of these other factors relate to electrical power and its consumption, and to data consumption.

Figure 9:
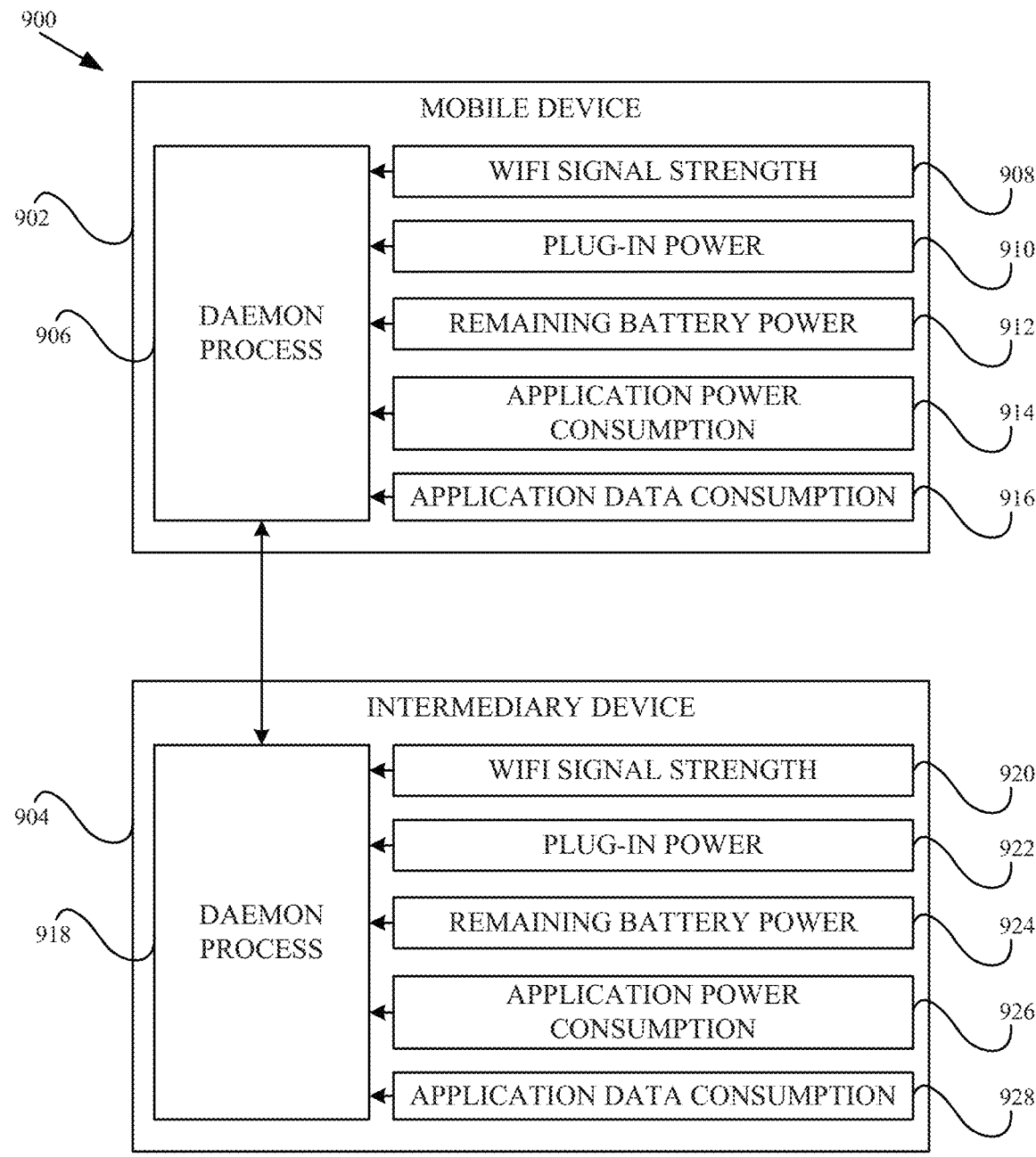
FIG. 9 is a block diagram that illustrates a system in which a daemon process considers various factors when determining the type of communication session that is to be used, according to some embodiments.

FIG. 9 is a block diagram that illustrates a system 900 in which a daemon process considers various factors when determining the type of communication session that is to be used, according to some embodiments. As shown in FIG. 9, system 900 includes a mobile device 902 and an intermediary device 904. Mobile device 902 executes daemon process 906. Intermediary device 904 executes daemon process 918. Daemon processes 906 and 918 can communicate state values to each other. Daemon process 906 can use the state values of both devices to determine the type of communication session that is to be used.

Daemon process 906 can measure the following state attributes of mobile device 902: WiFi signal strength 908, plug-in power 910, remaining battery power 912, application power consumption 914, and application data consumption 916. Similarly, daemon process 918 can measure the following state attributes of intermediary device 904: WiFi signal strength 920, plug-in power 922, remaining battery power 924, application power consumption 926, and application data consumption 928. These state attributes are discussed below.

In some embodiments, the state values exchanged by each device can include an indication of whether that device is currently plugged in to an alternating current (AC) power supply (typically through an electrical socket outlet in a building). If the mobile device is currently plugged in to an AC power supply but the intermediary device is not, then this fact can influence the daemon process to favor the selection of a direct-to-Internet communication session over a direct-to-intermediary device communication session, though other factors also could be considered in combination with this factor. Conversely, if the mobile device is not currently plugged in to an AC power supply but the intermediary device is, then this fact can influence the daemon process to favor the selection of a direct-to-intermediary device communication session over a direct-to-Internet communication session, though other factors also could be considered in combination with this factor. The device having more electrical power available can be viewed as being more capable of handling the burden of HTTP communication.

In some embodiments, the state values exchanged by each device can include an indication of a level of battery power remaining to that device. If the mobile device's level of battery power, or estimated remaining on-time using that level of battery power, is greater than or equal to that of the intermediary device, then this fact can influence the daemon process to favor the selection of a direct-to-Internet communication session over a direct-to-intermediary device communication session, though other factors also could be considered in combination with this factor. Conversely, if the mobile device's level of battery power, or estimated remaining on-time using that level of battery power, is greater than or equal to that of the intermediary device, then this fact can influence the daemon process to favor the selection of a direct-to-intermediary device communication session over a direct-to-Internet communication session, though other factors also could be considered in combination with this factor. Again, the device having more electrical power available can be viewed as being more capable of handling the burden of HTTP communication.

In some embodiments, the state values exchanged by each device can include a sum of estimates of power consumption of all applications currently executing on that device. Some applications, such as those that perform intense computational processing (often involved in real-time three-dimensional graphics applications, for example), can consume power at a much greater rate than other applications. A given application's estimated power consumption might change over time due to that application changing the operations that it is performing or due to the application being placed in a background state, for example.

If the mobile device's sum of estimated application-specific power consumption is less than or equal to that of the intermediary device, then this fact can influence the daemon process to favor the selection of a direct-to-Internet communication session over a direct-to-intermediary device communication session, though other factors also could be considered in combination with this factor. Conversely, if the mobile device's sum of estimated application-specific power consumption is greater than that of the intermediary device, then this fact can influence the daemon process to favor the selection of a direct-to-intermediary device communication session over a direct-to-Internet communication session, though other factors also could be considered in combination with this factor. The device that has a lower rate of aggregated application-specific power consumption can be viewed as being more capable of handling the burden of HTTP communication.

In some embodiments, the state values exchanged by each device can include a sum of estimates of data consumption (e.g., in data units per time unit) of all applications currently executing on that device. Some applications can consume data at a much greater rate than other applications. A given application's estimated data consumption might change over time due to that application changing the operations that it is performing or due to the application being placed in a background state, for example.

If the mobile device's sum of estimated application-specific data consumption is less than or equal to that of the intermediary device, then this fact can influence the daemon process to favor the selection of a direct-to-Internet communication session over a direct-to-intermediary device communication session, though other factors also could be considered in combination with this factor. Conversely, if the mobile device's sum of estimated application-specific data consumption is greater than that of the intermediary device, then this fact can influence the daemon process to favor the selection of a direct-to-intermediary device communication session over a direct-to-Internet communication session, though other factors also could be considered in combination with this factor. The device that has a lower rate of aggregated application-specific data consumption can be viewed as being more capable of handling the burden of HTTP communication.

V. Transport Mechanisms and SSL Provision

As is discussed above, in some embodiments, an intermediary device involved in a communication session with a mobile device can unpackage HTTP requests arriving from the mobile device prior to transmitting those HTTP requests on to the Internet. Such packaging can involve adding, to HTTP data, headers that enable the HTTP data to be transported according to a specific protocol (e.g., Bluetooth) being used in the mobile device-to-intermediary device connection, for example.

Additionally, an intermediary device involved in a communication session with a mobile device can package HTTP responses arriving from the Internet prior to transmitting those HTTP responses on to the mobile device. Such unpackaging can involve stripping, from HTTP data, headers that enabled the HTTP data to be transported according to a specific protocol (e.g., Bluetooth) being used in the mobile device-to-intermediary device connection, for example.

In some embodiments, in addition to performing such packaging and unpackaging, the intermediary device also can perform encryption and decryption functions relative to HTTP data that will flow between the intermediary device and the Internet. In some embodiments, upon being involved in the establishment of a communication session with a mobile device, an intermediary device can establish a separate secure sockets layer (SSL) connection to a destination on the Internet. This destination typically will be the server with which the application originating the HTTP communications is attempting to communicate.

The intermediary device can send HTTP requests and receive HTTP responses through the SSL connection. The SSL connection is separate and distinct from the intermediary device's connection to the mobile device. In this manner, some tasks, such as those involving encryption and decryption, can under some circumstances be offloaded from the mobile device onto the intermediary device.

Figure 8:
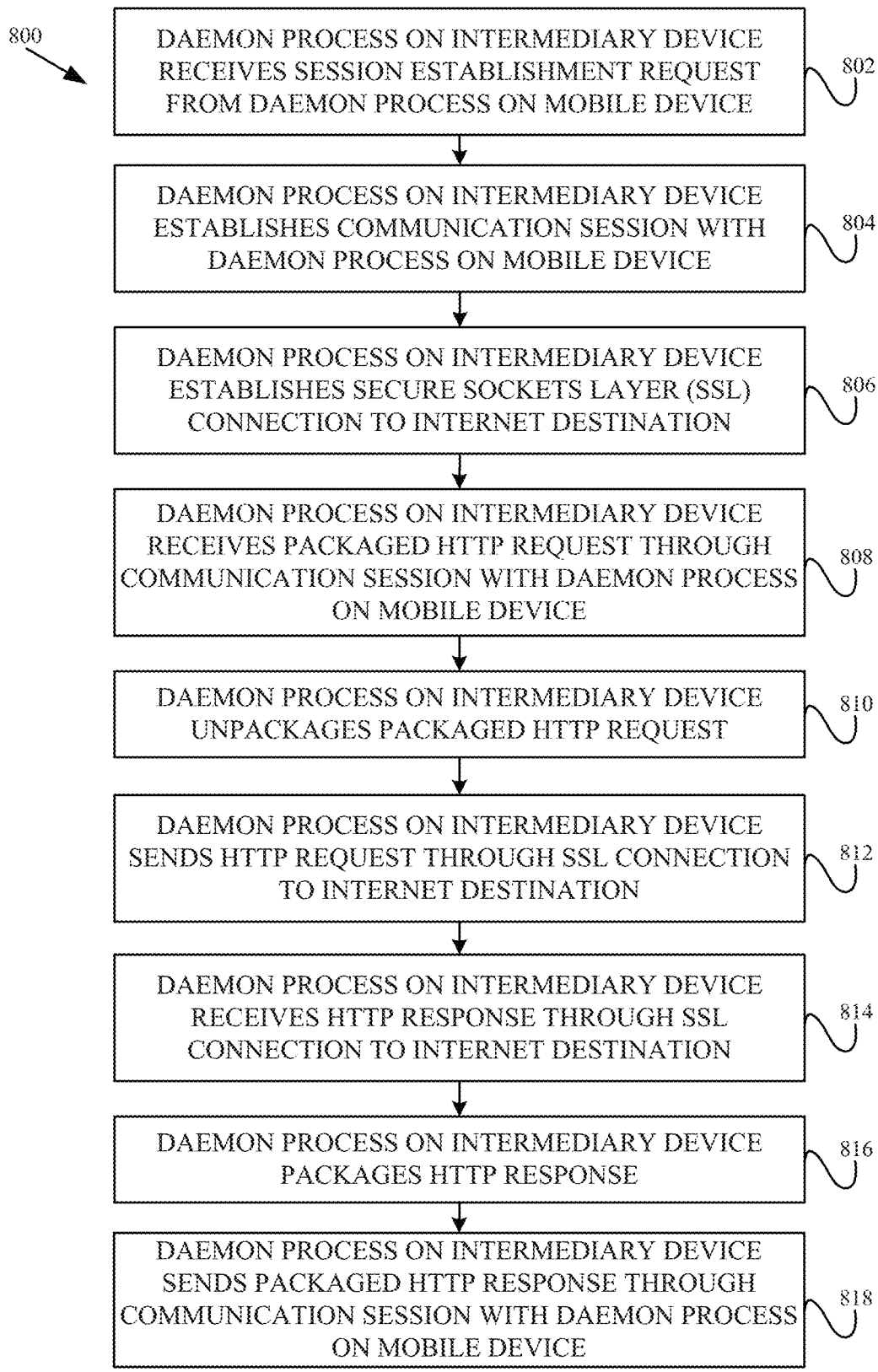
FIG. 8 is a flow diagram that illustrates an example of a technique through which an intermediary device can perform protocol translation and cryptography functions on behalf of a mobile device, according to some embodiments.

FIG. 8 is a flow diagram that illustrates an example of a technique 800 through which an intermediary device can perform protocol translation and cryptography functions on behalf of a mobile device, according to some embodiments. Although the example technique involves operations being performed in a specific order, variants of the technique according to some embodiments can involve these or different operations being performed in different orders.

In block 802, a daemon process on an intermediary device receives a session establishment request from a daemon process on a mobile device. For example, referring to FIG. 3, daemon process 316 can receive a session establishment request from daemon process 312.

In block 804, the daemon process on the intermediary device establishes a communication session with the daemon process on the mobile device. For example, daemon process 316 can establish a communication session with daemon process 312.

In block 806, the daemon process on the intermediary device establishes a secure sockets layer (SSL) connection to an Internet destination. For example, daemon process 316 can establish an SSL connection to server 308 over Internet 306.

In block 808, the daemon process on the intermediary device receives a packaged HTTP request through the communication session established with the daemon process on the mobile device. For example, daemon process 316 can receive a packaged HTTP request through a communication session established with daemon process 312.

In block 810, the daemon process on the intermediary device unpackages the packaged HTTP request. For example, daemon process 316 can unpackage the packaged HTTP request received from daemon process 312.

In block 812, the daemon process on the intermediary device sends the HTTP request through the SSL connection to the Internet destination. For example, daemon process 316 can send the HTTP request through the SSL connection to server 308 over Internet 306.

In block 814, the daemon process on the intermediary device receives an HTTP response through the SSL connection to the Internet destination. For example, daemon process 316 can receive an HTTP response through the SSL connection to server 308 over Internet 306.

In block 816, the daemon process on the intermediary device packages the HTTP response. For example, daemon process 316 can package the packaged HTTP response received through the SSL connection to server 308.

In block 818, the daemon process on the intermediary device sends the packaged HTTP response through the communication session established with the daemon process on the mobile device. For example, daemon process 316 can send the packaged HTTP response through the communication session established with daemon process 312. Daemon process 312 can subsequently receive the packaged HTTP response, unpackage the HTTP response, and transmit the HTTP response to an appropriate one of applications 310A and 310B.

VI. Delayed Communication Using Background Sessions

According to some embodiments discussed above, when an application on the mobile device attempts to send an HTTP request across the Internet via the intermediary device, the daemon process on the mobile device sends the HTTP request toward the intermediary device as soon as possible. However, according to some embodiments, under some circumstances, the daemon process on the mobile device can intentionally delay the sending of the HTTP request toward the intermediary device or other destinations for various reasons.

For example, in some embodiments, if the daemon process on the mobile device cannot currently establish a direct-to-Internet communication session or a direct-to-intermediary device communication session, then the daemon process can responsively place the HTTP request into a queue on the mobile device until the daemon process is able to establish either one or the other kind of session. HTTP requests in the queue are deemed to belong to a "background session." After establishing a communication session, the mobile device can send, through that communication session, the HTTP requests that are currently contained in the queue.

For another example, in some embodiments, the daemon process on the mobile device can determine, based on specified criteria, that a particular HTTP request should be sent through a particular kind of communication session (e.g., direct-to-Internet or direct-to-intermediary device). Under such circumstances, if the daemon process on the mobile device is currently not engaged in that particular kind of communication session, then the daemon process can hold the HTTP request in the queue on the mobile device until the mobile device becomes engaged in that particular kind of session.

For another example, in some embodiments, the daemon process on the mobile device can periodically poll the daemon process on the intermediary device to determine whether it is currently appropriate to attempt to transmit HTTP requests over the Internet. The intermediary device can respond positively or negatively. If the intermediary device responds negatively, then the mobile device can hold HTTP requests incoming from applications in the queue until the mobile device later receives a positive response from the intermediary device. In response to receiving a positive response from the intermediary device, the daemon process on the mobile device can send, through the communication session established with the intermediary device, at least one HTTP request that is currently contained in the mobile device's queue. In some embodiments, the daemon process on the mobile device can poll the intermediary device after each transmission of an HTTP request.

There are various factors that can be involved in the intermediary device's daemon process's formulation of a positive or negative response. For example, in determining whether to respond positively or negatively, the daemon process on the intermediary device can take into account various attributes of the intermediary device's current state. These attributes can include state attributes discussed above as well as others. For example, the daemon process on the intermediary device can generate a score that is influenced by current detected WiFi signal strengths (its own and/or those of the mobile device), current battery power levels (its own and/or those of the mobile device), current application power consumption aggregates (its own and/or those of the mobile device), and current application data consumption aggregates (its own and/or those of the mobile device). If the score exceeds a specified threshold, then the intermediary device can respond positively to the mobile device's daemon process's polling. The daemon process on the intermediary device can effectively delay HTTP communication through the intermediary device until circumstances as a whole are opportune.

In some embodiments, the mobile device's daemon process performs the special handling and potentially delayed delivery of HTTP requests discussed above in response to an application on the mobile device instructing the daemon process on the mobile device to handle its HTTP requests using a background session. In such embodiments, in the absence of such an instruction from an application, the daemon process attempts to deliver that application's HTTP requests as soon as possible. In some embodiments, the daemon process on the mobile device can schedule individual HTTP requests for delivery at specific future times.

VII. Hardware Overview

Figure 10A:
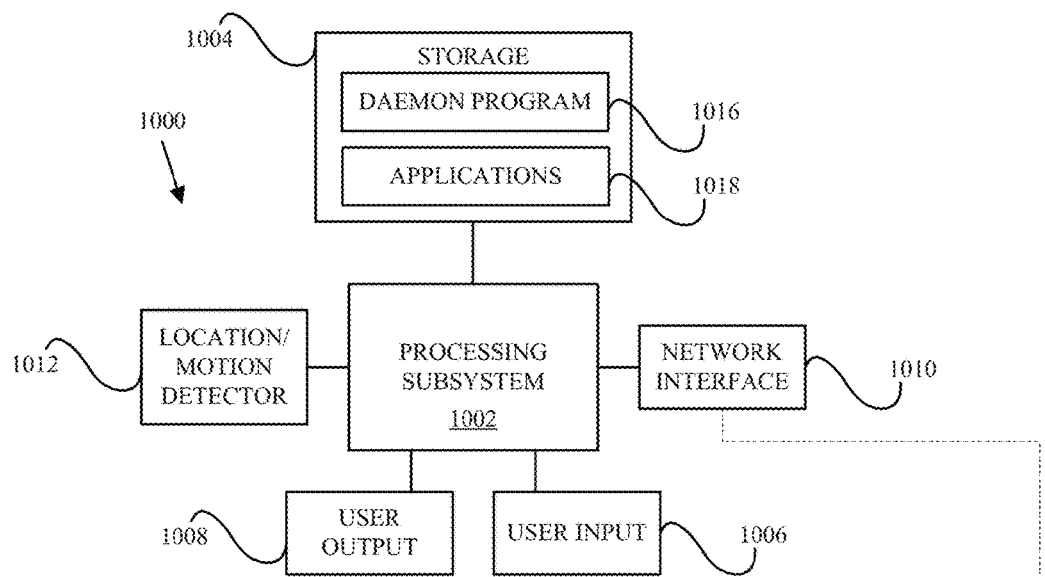
FIG. 10A is a simplified block diagram of an implementation of a mobile device according to some embodiments.

FIG. 10A is a simplified block diagram of an implementation of a mobile device 1000 according to some embodiments. Device 1000 can be a mobile device, a handheld device, a notebook computer, a desktop computer, or any suitable electronic device with a screen for displaying images and that is capable of communicating with an intermediary device 1050 as described herein. In some embodiments, device 1000 is a wearable device such as an Apple iPod, headphones, or a watch. Device 1000 includes a processing subsystem 1002, a storage subsystem 1004, a user input device 1006, a user output device 1008, a network interface 1010, and a location/motion detector 1012.

Processing subsystem 1002, which can be implemented as one or more integrated circuits (e.g., e.g., one or more single-core or multi-core microprocessors or microcontrollers), can control the operation of device 1000. In various embodiments, processing subsystem 1002 can execute a variety of programs in response to program code and can maintain multiple concurrently executing programs or processes. At any given time, some or all of the program code to be executed can be resident in processing subsystem 1002 and/or in storage subsystem 1004.

Through suitable programming, processing subsystem 1002 can provide various functionality for device 1000. For example, processing subsystem 1002 can execute a daemon program 1016 as a daemon process. Daemon program 1016 can perform various embodiments described herein.

Storage subsystem 1004 can be implemented, e.g., using disk, flash memory, or any other storage media in any combination, and can include volatile and/or non-volatile storage as desired. In some embodiments, storage subsystem 1004 can store one or more application programs to be executed by processing subsystem 1002 (e.g., applications 1018 and daemon program 1016). In some embodiments, storage subsystem 1004 can store other data (e.g., used by and/or defined by applications 1018 and/or daemon program 1016). Programs and/or data can be stored in non-volatile storage and copied in whole or in part to volatile working memory during program execution.

A user interface can be provided by one or more user input devices 1006 and one or more user output devices 1008. User input devices 1006 can include a touch pad, touch screen, scroll wheel, click wheel, dial, button, switch, keypad, microphone, or the like. User output devices 1008 can include a video screen, indicator lights, speakers, headphone jacks, or the like, together with supporting electronics (e.g., digital-to-analog or analog-to-digital converters, signal processors, or the like). A customer can operate input devices 1006 to invoke the functionality of device 1000 and can view and/or hear output from device 1000 via output devices 1008.

Network interface 1010 can provide voice and/or data communication capability for device 1000. For example, network interface 1010 can provide device 1000 with the capability of communicating with intermediary device 1050. In some embodiments, network interface 1010 can include radio frequency (RF) transceiver components for accessing wireless voice and/or data networks (e.g., using cellular telephone technology, Bluetooth technology, advanced data network technology such as 5G, 4G or EDGE, WiFi (IEEE 502.11 family standards, or other mobile communication technologies, or any combination thereof), and/or other components). In some embodiments network interface 1010 can provide wired network connectivity (e.g., Ethernet) in addition to or instead of a wireless interface. Network interface 1010 can be implemented using a combination of hardware (e.g., antennas, modulators/demodulators, encoders/decoders, and other analog and/or digital signal processing circuits) and software components.

Location/motion detector 1012 can detect a past, current or future location of device 1000 and/or a past, current or future motion of device 1000. For example, location/motion detector 1012 can detect a velocity or acceleration of mobile electronic device 1000. Location/motion detector 1012 can comprise a Global Positioning Satellite (GPS) receiver and/or an accelerometer. In some instances, processing subsystem 1002 determines a motion characteristic of device 1000 (e.g., velocity) based on data collected by location/motion detector 1012. For example, a velocity can be estimated by determining a distance between two detected locations and dividing the distance by a time difference between the detections.

Figure 10B:
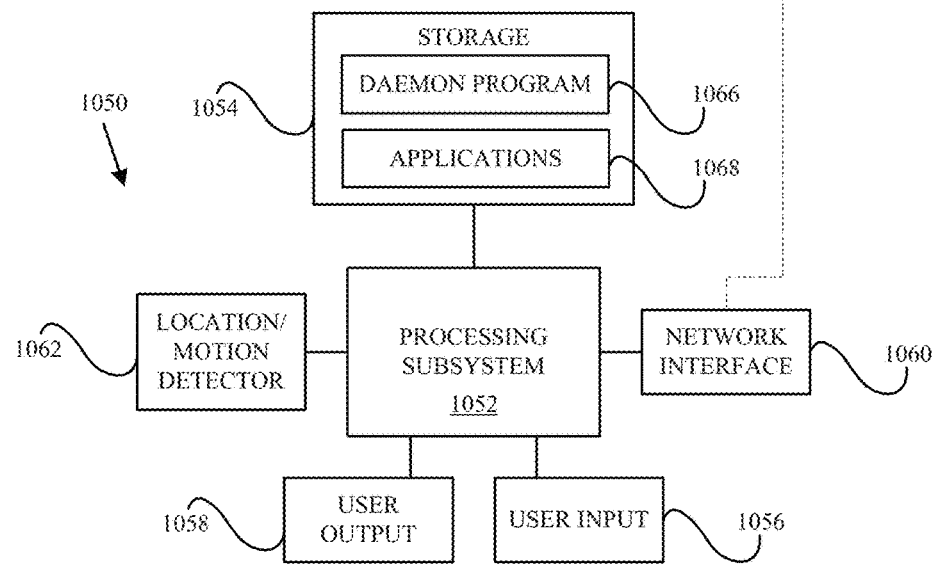
FIG. 10B is a simplified block diagram of an implementation of an intermediary device according to some embodiments.

FIG. 10B is a simplified block diagram of an implementation of an intermediary device 1050 according to some embodiments. Intermediary device 1050 includes a processing subsystem 1052, storage subsystem 1054, a user input device 1056, a user output device 1058, and a network interface 1060. Network interface 1060 can have similar or identical features as network interface 1010 of device 1000 described above. In some embodiments, intermediary device 1050 can be an Apple iPhone.

Processing subsystem 1052, which can be implemented as one or more integrated circuits (e.g., a conventional microprocessor or microcontroller), can control the operation of intermediary device 1050. In various embodiments, processing subsystem 1052 can execute a variety of programs in response to program code and can maintain multiple concurrently executing programs or processes. At any given time, some or all of the program code to be executed can be resident in processing subsystem 1052 and/or in storage subsystem 1054.

Through suitable programming, processing subsystem 1052 can provide various functionality for intermediary device 1050. Thus, intermediary device 1050 can interact with daemon program 1016 being executed on device 1000 in order to send wireless signals and/or data transmissions to device 1000. In one embodiment, intermediary device 1050 device emits wireless signals (e.g., Bluetooth signals) that mobile device 1000 can detect and to which mobile device 1000 can respond.

Storage subsystem 1054 can be implemented, e.g., using disk, flash memory, or any other storage media in any combination, and can include volatile and/or non-volatile storage as desired. In some embodiments, storage subsystem 1054 can store one or more application programs to be executed by processing subsystem 1052 (e.g., applications 1068 and daemon program 1066). In some embodiments, storage subsystem 1054 can store other data. Programs and/or data can be stored in non-volatile storage and copied in whole or in part to volatile working memory during program execution.

A user interface can be provided by one or more user input devices 1056 and one or more user output devices 1058. User input and output devices 1056 and 1058 can be similar or identical to user input and output devices 1006 and 1008 of device 1000 described above. In some instances, user input and output devices 1056 and 1058 are configured to allow a programmer to interact with intermediary device 1050.

It will be appreciated that mobile device 1000 and intermediary device 1050 described herein are illustrative and that variations and modifications are possible. A device can be implemented as a mobile electronic device and can have other capabilities not specifically described herein (e.g., telephonic capabilities, power management, accessory connectivity, etc.). In a system with multiple mobile devices 1000 and/or multiple companion devices 1050, different mobile devices 1000 and/or intermediary devices 1050 can have different sets of capabilities; the various mobile devices 1000 and/or intermediary devices 1050 can be but need not be similar or identical to each other.

Further, while mobile device 1000 and intermediary device 1050 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Various embodiments described herein can be realized in a variety of apparatus including electronic devices implemented using any combination of circuitry and software.

Additionally, while mobile device 1000 and intermediary device 1050 are described as singular entities, it is to be understood that each can include multiple coupled entities.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components.

The subsystems can be interconnected via a system bus. Additional subsystems can be a printer, keyboard, fixed disk, monitor, which can be coupled to display adapter. Peripherals and input/output (I/O) devices, which couple to an I/O controller, can be connected to the computer system by any number of means known in the art, such as serial port. For example, serial port or external interface (e.g. Ethernet, Wi-Fi, etc.) can be used to connect computer system to a wide area network such as the Internet, a mouse input device, or a scanner. The interconnection via the system bus can allow the central processor to communicate with each subsystem and to control the execution of instructions from system memory or the fixed disk, as well as the exchange of information between subsystems. The system memory and/or the fixed disk may embody a computer readable medium. Any of the values mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments described herein can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments described herein using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to some embodiments may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments described herein. However, other embodiments may be directed to specific embodiments relating to each individual aspect, or specific combinations of these individual aspects The above description of exemplary embodiments has been presented for the purposes of illustration and description. It is not intended to be exhaustive or to limit any invention to the precise form described, and many modifications and variations are possible in light of the teaching above. The embodiments were chosen and described in order to best explain the principles of inventions and their practical applications to thereby enable others skilled in the art to best utilize these inventions in various embodiments and with various modifications as are suited to the particular use contemplated.

What is claimed is:

1. A method comprising:
at a wearable device having one or more processors, a first wireless interface for connecting to a network, and a second wireless interface for connecting to a mobile phone that has a third wireless interface for connecting to the network:
receiving, at an application programming interface from an application executing on the wearable device, a request to obtain data from a server accessible by the network;
determining, by one or more routines of the application programming interface, whether a connection between the wearable device and the mobile phone exists over the second wireless interface;
based on whether the connection between the wearable device and the mobile phone exists, determining, by the one or more routines:
whether to establish a first session directly between the wearable device and the network to obtain the requested data, or
whether to establish a second session between the wearable device and the mobile phone to instruct the mobile phone to obtain the requested data via the network;
establishing a first communication session to obtain the requested data, wherein the first communication session is one of the first session or the second session;
receiving initial state values from the mobile phone, wherein the initial state values include initial attributes of the mobile phone including one of WiFi signal strength, plug-in power, remaining battery power, application power consumption, and application data consumption, wherein determining whether to establish the first session or the second session is further based on the initial state values;
transmitting, by the one or more routines of the application programming interface of the application, data from the wearable device over the first communication session;
receiving, by the one or more routines, data through the first communication session;
after establishing the first session or the second session, receiving a current state value from the mobile phone, wherein the current state value includes a current attribute of the mobile phone; and
based on whether the current state value exceeds the a current threshold, switching from the first session or the second session to an other of the first session or the second session.

2. The method of claim 1, further comprising:
at the wearable device:
determining, at a first moment, that the first session is to be established;
in response to determining that the first session is to be established, and in response to a first invocation of the one or more routines by the application, establishing, by the one or more routines, the first session directly between the wearable device and the network;
transmitting, by the one or more routines, data from the wearable device directly to the network over the first session;
receiving, by the one or more routines, data directly from the network through the first session;
sending, to the application, the data received directly from the network through the first session;

determining, at a second moment, that the second session is to be established;

in response to determining that the second session is to be established, and in response to a second invocation of the one or more routines by the application, establishing, by the one or more routines, the second session between the wearable device and the mobile phone that is connected to the network;

transmitting, by the one or more routines, from the wearable device to the mobile phone over the second session, data destined for the network;

receiving, through the second session, data that the mobile phone received from the network; and sending, to the application, the data that the mobile phone received from the network;

wherein the first wireless interface differs from the second wireless interface.

3. The method of claim 2, further comprising:
at the wearable device:
in response to invocation, by the application, of a particular routine of the application programming interface, configuring, by the particular routine, the one or more routines to establish the second session instead of the first session.

4. The method of claim 3, wherein the invocation of the particular routine passes an identity of the mobile phone as a parameter to the particular routine.

5. The method of claim 2, wherein the transmitting from the wearable device to the mobile phone over the second session comprises packaging, at the wearable device, the data destined for the network to conform to a non-WiFi protocol used in a wireless connection between the wearable device and the mobile phone.

6. The method of claim 1, further comprising:
at the wearable device:
determining, by the one or more routines, whether the wearable device currently detects a wireless signal associated with the network; and
in response to determining, by the routines, that the wearable device currently does not detect a wireless signal associated with the network, the one or more routines establishing the second session instead of the first session.

7. The method of claim 6, further comprising:
at the wearable device:
after establishing the second session, determining, by the one or more routines, that the wearable device currently detects a wireless signal associated with the network; and
in response to determining, by the one or more routines, that the wearable device currently detects the wireless signal, the one or more routines establishing the first session instead of the second session.

8. The method of claim 1, wherein the establishing of the second session comprises the one or more routines activating a component of the mobile phone that establishes a secure socket layer (SSL) connection between the mobile phone and a destination in the network.

9. The method of claim 1, wherein the establishing of the second session comprises the one or more routines establishing the second session in response to determining that a remaining battery charge of the mobile phone exceeds a remaining battery charge of the wearable device.

10. The method of claim 1, wherein the establishing of the second session comprises the one or more routines establishing the second session in response to determining that a WiFi signal strength of the mobile phone to the network exceeds a WiFi signal strength of the wearable device to the network.

11. The method of claim 1, further comprising:
at the wearable device:
requesting, from the mobile phone, an indication of whether a transmission of a hypertext transfer protocol (HTTP) request between the mobile phone and the network is currently feasible; and
in response to receiving, from the mobile phone, an indication that transmission of the HTTP request is not currently feasible between the mobile phone and the network, placing the HTTP request in a queue until an indication that transmission of the HTTP request is currently feasible between the mobile phone and the network is received from the mobile phone.

12. The method of claim 1, further comprising:
prior to determining whether the connection between the wearable device and the mobile phone exists over the second wireless interface, attempting to establish the connection between the wearable device and the mobile phone over the second wireless interface.

13. The method of claim 1, further comprising:
determining that the first session or the second session is unavailable; and
placing the request to obtain data in a queue to be sent when the first session or the second session is available.

14. The method of claim 1, further comprising:
establishing a second communication session, wherein the second communication session is the other of the first session or the second session;
after establishing the second communication session, tearing down the first communication session;
transmitting, by the one or more routines of the application programming interface of the application, data from the wearable device over the second communication session; and
receiving, by the one or more routines, data through the second communication session.

15. The method of claim 1, wherein the steps of determining whether to establish a first session and whether to establish a second session are further based on state values of the wearable device.

16. The method of claim 15, wherein the state values of the wearable device include at least one selected from a group of: signal strength, power available, and data consumption.

17. The method of claim 1, wherein the wearable device is a watch.

18. A method comprising:
at an intermediary device having one or more processors:
transmitting initial state values of the intermediary device to a mobile device;
based on the initial state values, establishing a first connection to the mobile device;
receiving, over the first connection, a request that has been packaged to conform to a first protocol used by the first connection;
unpackaging the request;
establishing a second connection to a network;
sending the unpackaged request over the second connection using a second protocol that is different than the first protocol;
receiving, over the second connection, a response to the request;

packaging the response to conform to the first protocol used by the first connection;
sending the packaged response over the first connection;
transmitting current state values of the intermediary device to the mobile device;
after establishing the first connection or the second connection, receiving a current state value from the mobile device, wherein the current state value includes a current attribute of the mobile device including at least on selected from a group of: signal strength, power available, and data consumption; and
based on whether the current state value exceeds the a current threshold, switching from the first connection or the second connection to an other of the first connection or the second connection.

19. The method of claim 18, wherein establishing the second connection to the network comprises establishing a secure sockets layer (SSL) connection to a destination in the network.

20. The method of claim 18, wherein receiving the request over the first connection comprises receiving the request within a remote procedure call to a routine implemented by the intermediary device.

21. The method of claim 18, wherein receiving the request over the first connection comprises receiving the request within an XML procedure call to a routine implemented by the intermediary device.

22. The method of claim 18, wherein the first connection is a Bluetooth connection, and wherein the first protocol is Bluetooth protocol.

23. The method of claim 18, wherein the request is an HTTP request.

24. The method of claim 18, wherein the signal strength includes WiFi signal strength of the intermediary device to the network.

25. The method of claim 18, wherein the power available includes at least one selected from a group of: whether the intermediary device is plugged in to a power supply, battery power remaining on the intermediary device, and power consumption of applications executing on the intermediary device.

26. The method of claim 18, wherein the data consumption includes data consumption of applications executing on the intermediary device.

27. A wearable device comprising:
a memory;
a first wireless interface for connecting to a network, and a second wireless interface for connecting to a mobile phone that has a third wireless interface for connecting to the network; and
a processor coupled to the memory,
wherein the processor is configured to perform a method comprising:
receiving, at an application programming interface from an application executing on the wearable device, a request to obtain data from a server accessible by the network;
determining, by one or more routines of the application programming interface, whether a connection between the wearable device and the mobile phone exists over the second wireless interface;
based on whether the connection between the wearable device and the mobile phone exists, determining, by the one or more routines:
whether to establish a first session directly between the wearable device and the network to obtain the requested data, or
whether to establish a second session between the wearable device and the mobile phone to instruct the mobile phone to obtain the requested data via the network;
establishing a first communication session to obtain the requested data, wherein the first communication session is one of the first session or the second session;
transmitting, by the one or more routines of the application programming interface of the application, data from the wearable device over the first communication session;
receiving, by the one or more routines, data through the first communication session;
receiving initial state values from the mobile phone, wherein the initial state values include initial attributes of the mobile phone, wherein determining whether to establish the first session or the second session is further based on the initial state values;
after establishing the first session or the second session, receiving a current state value from the mobile phone, wherein the current state value includes a current attribute of the mobile phone; and
based on whether the current state value exceeds the a current threshold, switching from the first session or the second session to an other of the first session or the second session.

28. A computer product comprising a non-transitory computer-readable storage medium storing instructions executable by one or more processors of a wearable device, having a first wireless interface for connecting to a network and a second wireless interface for connecting to a mobile phone that has a third wireless interface for connecting to the network, to cause the one or more processors to:
receive, at an application programming interface from an application executing on the wearable device, a request to obtain data from a server accessible by the network;
determine, by one or more routines of the application programming interface, whether a connection between the wearable device and the mobile phone exists over the second wireless interface;
based on whether the connection between the wearable device and the mobile phone exists, determine, by the one or more routines:
whether to establish a first session directly between the wearable device and the network to obtain the requested data, or
whether to establish a second session between the wearable device and the mobile phone to instruct the mobile phone to obtain the requested data; and
establish a first communication session to obtain the requested data, wherein the first communication session is one of the first session or the second session;
transmit, by the one or more routines of the application programming interface of the application, data from the wearable device over the first communication session;
receive, by the one or more routines, data through the first communication session;
receive initial state values from the mobile phone, wherein the initial state values include initial attributes of the mobile phone, wherein determining whether to establish the first session or the second session is further based on the initial state values;
after establishing the first session or the second session, receive a current state value from the mobile phone, wherein the current state value includes a current attribute of the mobile phone; and based on whether the current state value exceeds the a current threshold, switch from the first session or the second session to an other of the first session or the second session.

29. The computer product of claim 28, further comprising:

one or more processors communicably coupled with the non-transitory computer-readable storage medium, wherein the computer product is the wearable device.

30. A computer product comprising a non-transitory computer-readable storage medium storing instructions executable by one or more processors of an intermediary device to cause the one or more processors to:

transmit initial state values of the intermediary device to a mobile device;

based on the initial state values, establish a first connection to a mobile device;

receive, over the first connection, a request that has been packaged to conform to a first protocol used by the first connection;

unpackage the request;

establish a second connection to a network;

send the unpackaged request over the second connection using a second protocol that is different than the first protocol;

receive, over the second connection, a response to the request;

package the response to conform to the first protocol used by the first connection;

send the packaged response over the first connection;

transmit current state values of the intermediary device to the mobile device;

after establishing the first connection or the second connection, receiving a current state value from the mobile device, wherein the current state value includes a current attribute of the mobile device; and based on whether the current state value exceeds the a current threshold, switching from the first connection or the second connection to an other of the first connection or the second connection, wherein the initial state values and the current state values include at least one selected from a group of: signal strength, power available, and data consumption.

31. The computer product of claim 30, further comprising:

one or more processors communicably coupled with the non-transitory computer-readable storage medium, wherein the computer product is the intermediary device.

* * * * *